United States Patent
Ahn et al.

(10) Patent No.: US 11,840,361 B1
(45) Date of Patent: Dec. 12, 2023

(54) MAGNETIC HANDLING SYSTEMS FOR HAT STRINGERS AND RELATED METHODS

(71) Applicant: The Boeing Company, Chicago, IL (US)

(72) Inventors: Jonathan Young Ahn, Seattle, WA (US); Christopher Robert Brown, Seattle, WA (US); Ricardo Andreas Fritzke, Sammamish, WA (US); Shuonan Dong, Seattle, WA (US); Bonnie Ann Keefe, Everett, WA (US); Jonathan Alejandro Santiago, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/888,381

(22) Filed: Aug. 15, 2022

(51) Int. Cl.
*B64F 5/10* (2017.01)
*B25J 15/06* (2006.01)
*B64C 1/06* (2006.01)

(52) U.S. Cl.
CPC .............. *B64F 5/10* (2017.01); *B64C 1/064* (2013.01)

(58) Field of Classification Search
CPC .......... B25B 11/00; B25B 11/002; B64F 5/10; B64F 5/50; Y10T 29/53961;
(Continued)

(56) References Cited

U.S. PATENT DOCUMENTS 8,137,499 B2   3/2012   Luebbering et al.
8,889,050 B2   11/2014  Nitsch
(Continued)

FOREIGN PATENT DOCUMENTS

CN   206703549 U   12/2017
CN   113021938 A   6/2021
EP     3112116 B1   8/2018

OTHER PUBLICATIONS

Machine-generated English language translation of of CN113021938A, downloaded from Google Patents Aug. 15, 2022.
(Continued)

*Primary Examiner* — Tyrone V Hall, Jr.
(74) *Attorney, Agent, or Firm* — Kolitch Romano Dascenzo Gates LLC

(57) ABSTRACT

The magnetic handling systems comprise a bladder and a magnetic carriage system. The bladder is configured to be received within a stringer interior volume of a hat stringer and comprises a magnetic insert having a plurality of magnetic walls, each configured to align with a respective wall portion of the hat stringer. The magnetic carriage system comprises a carriage having a magnetic head that comprises a bracket and a plurality of magnetic sources supported by the bracket. Each magnetic source is configured to magnetically couple with a respective magnetic wall of the magnetic insert to produce an attractive magnetic force therebetween. The methods comprise disposing a bladder having a plurality of the magnetic inserts within the hat stringer, magnetically engaging a plurality of the magnetic heads with the plurality of magnetic inserts, and conforming the hat stringer by moving at least one magnetic head relative to another magnetic head.

21 Claims, 13 Drawing Sheets

(58) Field of Classification Search
CPC .......... Y10T 29/53983; Y10T 29/53991; B25J 15/0608; B23Q 3/15; B23Q 3/1546; B66C 1/04; H01F 7/0252; H01F 7/0257; H01F 7/0247; H01F 7/0263
See application file for complete search history.

(56) References Cited

U.S. PATENT DOCUMENTS

| | | | |
|---|---|---|---|
| 9,120,553 B2 | 9/2015 | Gensewich et al. | |
| 9,205,606 B2 | 12/2015 | Reinhardt et al. | |
| 10,272,596 B2 | 4/2019 | Register | |
| 11,007,677 B2 | 5/2021 | Hannan et al. | |
| 11,065,832 B2 | 7/2021 | Takagi et al. | |
| 2012/0097323 A1* | 4/2012 | Nitsch ................. | B29C 33/76 156/212 |
| 2013/0240126 A1* | 9/2013 | Reinhardt ............ | B29C 31/008 156/182 |
| 2022/0080683 A1* | 3/2022 | Plummer ........... | B29D 99/0003 |

OTHER PUBLICATIONS

Machine-generated English language translation of of CN206703549U, downloaded from Google Patents Aug. 15, 2022.

* cited by examiner

MAGNETIC HANDLING SYSTEMS FOR HAT STRINGERS AND RELATED METHODS

FIELD

The present disclosure relates to magnetic handling systems for hat stringers and related methods.

BACKGROUND

Stringers are structural elements comprised in aircraft that typically are attached to support the aircraft skin. For example, aircraft wing boxes include a plurality of stringers that are attached to the upper and lower skins of the wing box and that extend generally aligned with the length of the wing. A hat stringer is a particular type of stringer that is hollow, defines an interior volume, and includes a cross-sectional shape that colloquially is described as a hat or omega shape. During construction of aircraft, hat stringers must be lifted, carried, and often shaped according to the section of the aircraft skin along which the hat stringer is to be attached. With the development of composite aircraft in recent years, hat stringers often are formed of fiber-reinforced composite materials and are handled (e.g., lifted, carried, and/or positioned) during manufacture in an uncured, or partially cured state in which the hat stringer is susceptible to undesired wrinkling and deformation. Conventionally, uncured or partially cured hat stringers are handled utilizing a mandrel or bladder that is placed within the stringer interior volume, a reinforcing cover that is received on an exterior surface of the hat stringer, and a lifting mechanism with clamps that apply a squeezing force to lateral sides of the reinforcing cover. In part because the sidewalls of a hat stringer typically are canted towards one another, the squeezing force needed to lift the hat stringer with these conventional systems can deform the uncured or partially cured hat stringer and force the mandrel outwardly from the interior volume of the stringer.

SUMMARY

Magnetic handling systems and methods of handling hat stringers utilizing magnetic handling systems are disclosed herein. The magnetic handling systems comprise a bladder and a magnetic carriage system. The bladder comprises a magnetic insert and is configured to be received within a stringer interior volume of the hat stringer. The magnetic insert comprises a plurality of magnetic walls, each being positioned and oriented to extend at least substantially aligned with a respective wall portion of a wall of the hat stringer. The magnetic carriage system comprises a carriage that is configured to be coupled to a support structure and that comprises a magnetic head. The magnetic head comprises a bracket and a plurality of magnetic sources supported by the bracket. Each magnetic source is configured to magnetically couple with a respective magnetic wall of the magnetic insert to produce an attractive magnetic force therebetween such that the plurality of magnetic sources and the corresponding magnetically coupled plurality of magnetic walls produce a plurality of attractive magnetic forces oriented along a plurality of different directions. The methods comprise disposing a bladder that includes a plurality of magnetic inserts distributed along a bladder length of the bladder within the stringer interior volume of the hat stringer, and operably positioning a plurality of the magnetic heads relative to the hat stringer such that each magnetic head is aligned with a corresponding magnetic insert. The methods further comprise magnetically engaging each magnetic head with the corresponding magnetic insert while the bladder is received within the stringer interior volume. The magnetically engaging may comprise, respective to each magnetic head and the corresponding magnetic insert, magnetically coupling the plurality of magnetic sources comprised in the magnetic head with the respective plurality of magnetic walls comprised in the corresponding magnetic insert to produce a plurality of attractive magnetic forces therebetween, and retaining the hat stringer within the bracket of the magnetic head utilizing the plurality of attractive magnetic forces. The methods further may comprise conforming the hat stringer into a desired stringer longitudinal conformation. The conforming is performed subsequent to the magnetically engaging and while each magnetic head is magnetically engaged with the corresponding magnetic insert.

DESCRIPTION

Figure 1:
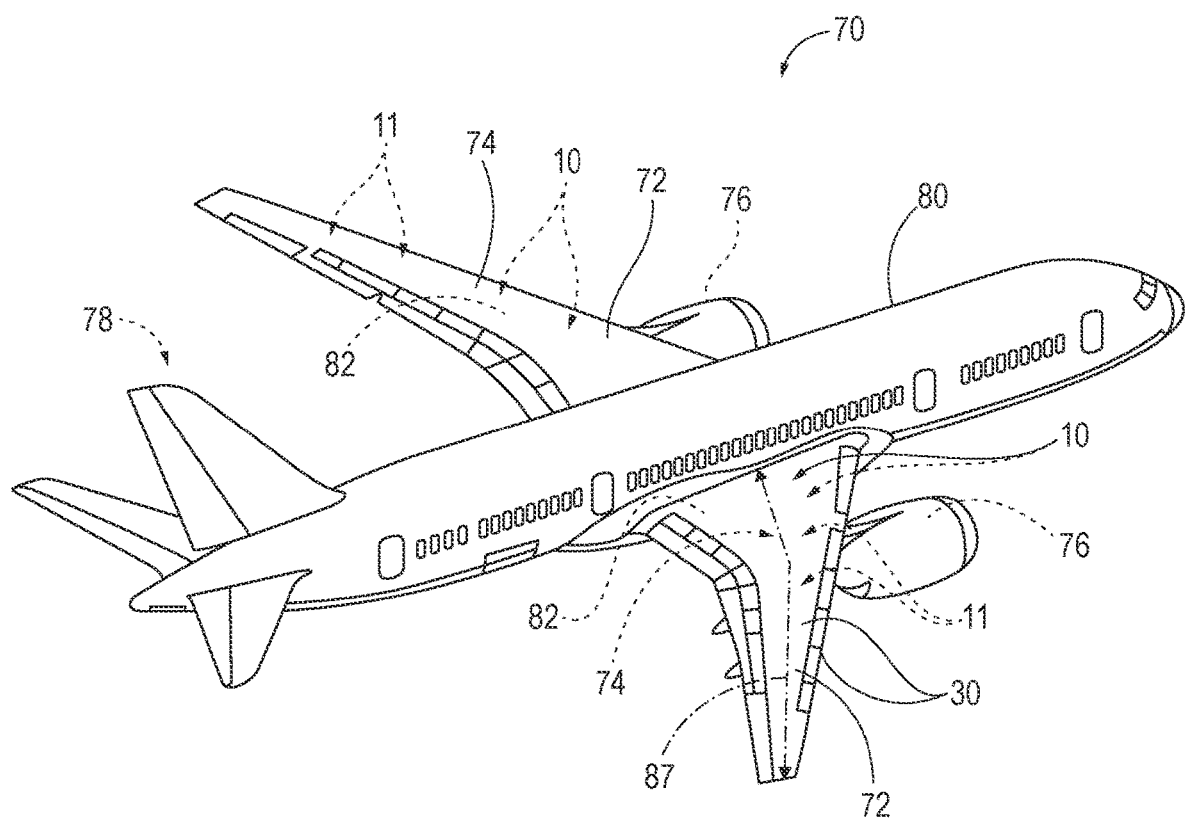
FIG. 1 is a schematic representation illustrating example aircraft according to the present disclosure.

FIGS. 1-13 provide examples of hat stringers 10, aircraft 70 comprising hat stringers 10, magnetic handling systems 100, and methods 500 of handling hat stringers utilizing magnetic handling systems according to the present disclosure. Elements that serve a similar, or at least substantially similar, purpose are labelled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. In schematic FIGS. 2-6, dot-dash lines are utilized to indicate virtual features (e.g., dimensions, axes, etc.) and these features may or may not be optional to the illustrated examples.

FIG. 1 is an illustration of example aircraft 70 that includes at least one hat stringer 10 handled by and/or installed in aircraft 70 utilizing magnetic handling systems 100 and/or according to methods 500 according to the present disclosure. Magnetic handling systems 100 and methods 500 are illustrated discussed in more detail herein with reference to FIGS. 3-13. As shown in the examples of FIG. 1, aircraft 70 typically comprises at least a fuselage 80 and wings 72 that are attached to the fuselage 80. Each wing 72 comprises an aircraft wing box 74, and each aircraft wing box 74 comprises a plurality of hat stringers 10. In general, hat stringers 10 extend along, or at least substantially aligned with, the length 87 of the corresponding wing 72. Wing box 74 further includes aircraft skins 30, namely, an upper skin and a lower skin, that define the exterior of wing 72. Each hat stringer 10 is attached to an interior face of aircraft skin 30 and may support aircraft skin 30 in a desired conformation. Accordingly, each hat stringer 10 at least generally follows the shape of the region of aircraft skin 30 along which hat stringer 10 is attached.

In some examples, each aircraft wing box 74 may include and/or define at last one aircraft fuel tank 82. In such examples, at least some of the hat stringers 10 are, or are configured to be utilized as, vent stringers 11. In some examples, vent stringers 11 are configured to vent fluid into and out of aircraft fuel tank 82, as will be understood by a person of ordinary skill in the art. Aircraft 70 also may comprise at least one engine 76, and each engine 76 may be operatively attached to a respective wing 72. Aircraft 70 further may include an empennage 78 that is attached to the fuselage 80.

Aircraft 70 may comprise any suitable type of aircraft, with examples comprising private aircraft, commercial aircraft, cargo aircraft, passenger aircraft, military aircraft, jetliners, wide-body aircraft, and/or narrow-body aircraft. Aircraft 70 is configured to, or may be used to, transport any suitable type of payload such as passengers, crew, cargo, and/or combinations thereof. While FIG. 1 shows an example in which aircraft 70 is a fixed wing aircraft, hat stringers 10 according to the present disclosure may be comprised and/or utilized with any other suitable type of aircraft, such as rotor craft and/or helicopters, without departing from the scope of the present disclosure.

Figure 2:
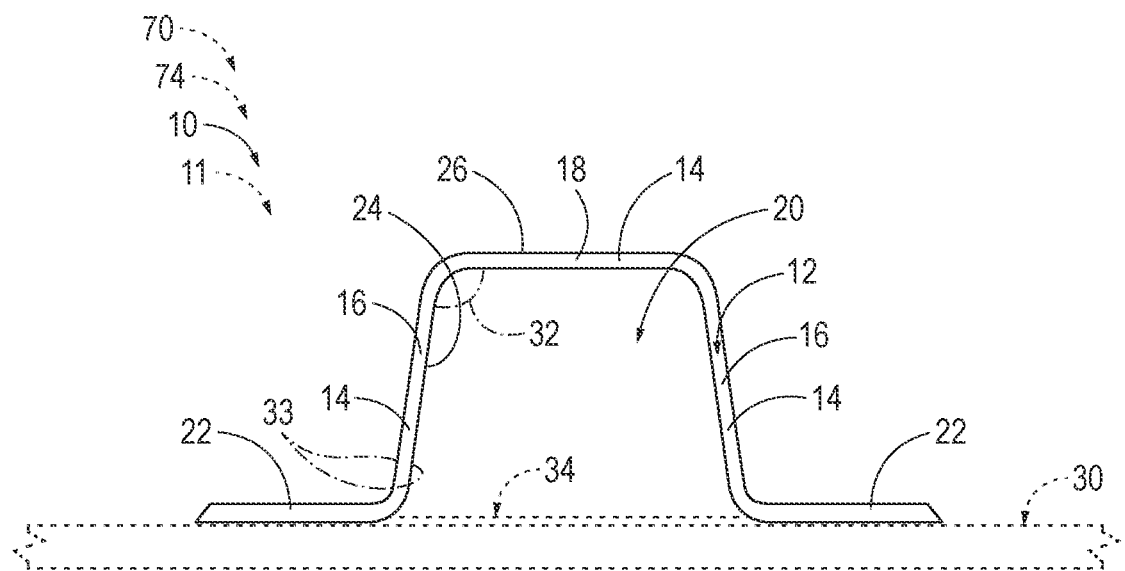
FIG. 2 is a schematic cross-sectional view illustrating examples of hat stringers according to the present disclosure.

FIG. 2 is a cross-sectional view showing an example of a hat stringer 10 optionally attached to an aircraft skin 30. The example hat stringer 10 of FIG. 2 may be comprised in an aircraft wing box 74, such as the aircraft wing box 74 of example aircraft 70 of FIG. 1. Hat stringer 10 also may be, or be utilized as, a vent stringer 11. As shown in FIG. 2, hat stringer 10 includes a wall 12 having a plurality of wall portions 14 that define a stringer interior volume 20. More specifically, wall portions 14 include a cap wall portion 18, a pair of sidewall portions 16, and a pair of flanges 22. Sidewall portions 16 are attached to and spaced apart from one another by cap wall portion 18. Each flange 22 is attached to and extends from a respective sidewall portion 16 and is spaced apart from cap wall portion 18 by the respective sidewall portion 16. Cap wall portion 18, sidewall portions 16, and flanges 22 may be monolithic and/or integral with one another. In some examples, flanges 22 extend at least substantially parallel to and aligned with one another, and flanges 22 may be affixed to a surface of aircraft skin 30. In some examples, hat stringer 10 includes a base wall 34 that is opposed to cap wall portion 18 and that extends between flanges 22. Cap wall portion 18 extends between sidewall portions 16, whereas flanges 22 extend away from cap wall portion 18, sidewall portions 16, and stringer interior volume 20. Accordingly, sidewall portions 16, cap wall portion 18, and optionally base wall 34 may be described as bounding stringer interior volume 20. The cross-sectional view of FIG. 2 is taken normal to a stringer length of hat stringer 10. As discussed in more detail herein, in some examples, wall 12, the portions thereof, and optionally base wall 34 extend the entire stringer length of hat stringer 10. Hat stringer 10 comprises any suitable stringer length, with examples of which include at least 2 meters, at least 3 meters, at least 4 meters, at least 5 meters, at least 10 meters, at least 15 meters, at least 20 meters, at least 25 meters, at most 5 meters, at most 10 meters, at most 15 meters, at most 20 meters, at most 25 meters, and/or at most 30 meters.

Each sidewall portion 16 extends transverse to the respective flange 22 and transverse to cap wall portion 18, such that sidewall portions 16 support cap wall portion 18 spaced away from, or in a manner of speaking, above, aircraft skin 30. Sidewall portions 16 may extend symmetrically between flanges 22 and cap wall portion 18. More specifically, in some examples, each sidewall portion 16 extends at a sidewall angle 32 with respect to cap wall portion 18. Examples of suitable sidewall angles 32 include at least 65°, at least 70°, at least 75°, at least 80°, at least 90°, at least 95°, at least 100°, at most 80°, at most 90°, at most 95°, at most 100°, at most 105°, and/or at most 110°, where sidewall angles 32 greater than 90° correspond to sidewall portions 16 projecting towards one another. Wall 12 defines a wall thickness 33 that is measured between a stringer wall interior surface 24 and a stringer wall exterior surface 26. In some examples, wall thickness 33 is at least substantially the same along sidewall portions 16 and optionally cap wall portion 18. In some examples, wall width is at least 2 millimeters, at least 5 millimeters, at least 8 millimeters, at least 10 millimeters, at least 15 millimeters, at least 20 millimeters, at most 10 millimeters, at most 15 millimeters, at most 20 millimeters, and/or at most 25 millimeters. Each wall portion also defines a width, which is measured in a plane normal to the stringer length of hat stringer 10. In some examples, the widths of sidewall portions 16 are at least substantially the same as one another and optionally at least substantially the same as, or greater than, the width of cap wall portion 18. Examples of the width of any given wall portion 14 include at least 2 centimeters, at least 3 centimeters, at least 4 centimeters, at least 5 centimeters, at least 6 centimeters, at least 7 centimeters, at least 8 centimeters, at most 5 centimeters, at most 6 centimeters, at most 7 centimeters, at most 8 centimeters, at most 10 centimeters, and/or at most 12 centimeters.

For examples in which hat stringer 10 is a vent stringer 11, stringer interior volume 20 may be utilized to channel fluid along a length of hat stringer 10. FIG. 2 illustrates examples in which wall 12 of hat stringer 10 is shaped to define stringer interior volume 20 with a generally trapezoidal cross-sectional shape. In other words, FIG. 2 illustrates examples in which hat stringer 10 may be described as having a hat-shape, an omega-shape, and/or as being an omega stringer. However, hat stringers 10 having cross-sectional geometries other than those specifically illustrated in FIG. 2 are within the scope of the present disclosure. More specifically, magnetic handling systems 100 and/or methods 500 discussed in more detail herein in connection to FIGS. 3-13, may be utilized to handle any suitable type of stringer having a hollow profile and/or that defines a stringer interior volume 20. As examples, magnetic handling systems 100 and/or methods 500 may be utilized to handle stringers having triangular, square, polygonal, and/or arched cross-sectional shapes and/or cross-sectional shapes in which one or more wall portions are rounded or arched.

In some examples, hat stringer 10 is formed of a fiber-reinforced composite material and/or may be referred to as composite hat stringer. In some examples, aircraft skin 30 likewise is formed of a fiber-reinforced composite material and/or may be referred to as a composite skin. Fiber-reinforced composite materials additionally or alternatively may be described as or referred to as fiber-reinforced polymers, or plastics. As used herein, a fiber-reinforced composite material should be understood to include at least an epoxy or other polymer or binding material together with fibers, such as (but not limited to) carbon fibers, boron fibers, para-aramid (e.g., Kevlar™) fibers, and/or other fibers. In some examples, the fibers are continuous and/or unidirectional. Additionally or alternatively, in some examples, the fibers are woven into a fabric. In some examples, hat stringer 10 is constructed of multiple layers, or plies, of fiber-reinforced composite material. In such examples, the fibers of a given layer, or ply, may be oriented in the same direction or in different directions. The number of layers or plies of fiber-reinforced composite material may define wall thickness 33 of hat stringer 10. For some examples in which hat stringer 10 includes base wall 34, base wall 34 may be constructed from fewer plies or layers of fiber-reinforced composite material than wall 12. Likewise, in some examples, aircraft skin 30 is constructed from multiple layers of plies or layers of fiber-reinforced composite material.

As discussed in more detail herein, magnetic handling systems 100 and/or methods 500 according to the present disclosure may be utilized to handle partially cured, or uncured, hat stringers 10. Herein, hat stringer 10 is referred to as being partially cured or uncured when the fiber-reinforced composite thereof is partially cured or uncured. A partially cured or uncured fiber-reinforced composite material is configured to be cured to form a cured fiber-reinforced composite material, where the fiber-reinforced composite material may be stronger, more rigid, less pliable, less deformable, and/or less yielding in the cured form than in the partially cured or uncured form. The layers of a cured fiber-reinforced composite material typically are hardened into a monolithic structure. Accordingly, a partially cured or uncured hat stringer 10 may be softer, more deformable, and/or more pliable than a cured hat stringer 10. More specifically, a partially cured or uncured hat stinger 10 may yield to manipulation. In other words, the shape or confor-mation of a partially cured or uncured hat stringer 10 may be manipulated such that a partially cured or uncured hat stringer adopts the shape or conformation into which it is manipulated. As described in more detail below, in some applications, an aircraft skin (or other surface) to which a hat stringer will be installed may have a non-planar geometry, and one illustrative manufacturing technique enabled by magnetic handling systems 100 and/or methods 500 includes imparting or enforcing a contour to a partially cured or uncured hat stringer that corresponds to the geometry, such as to ensure a better placement of the stringer and aircraft skin for co-curing. Conversely, in some examples, a cured hat stringer 10 may not yield to manipulation and/or will return to its original shape after being manipulated. In some examples, hat stringer 10 is co-cured with aircraft skin 30, in that aircraft skin 30 and hat stringer 10 are cured together and/or after hat stringer 10 is attached to aircraft skin 30.

Figure 3:
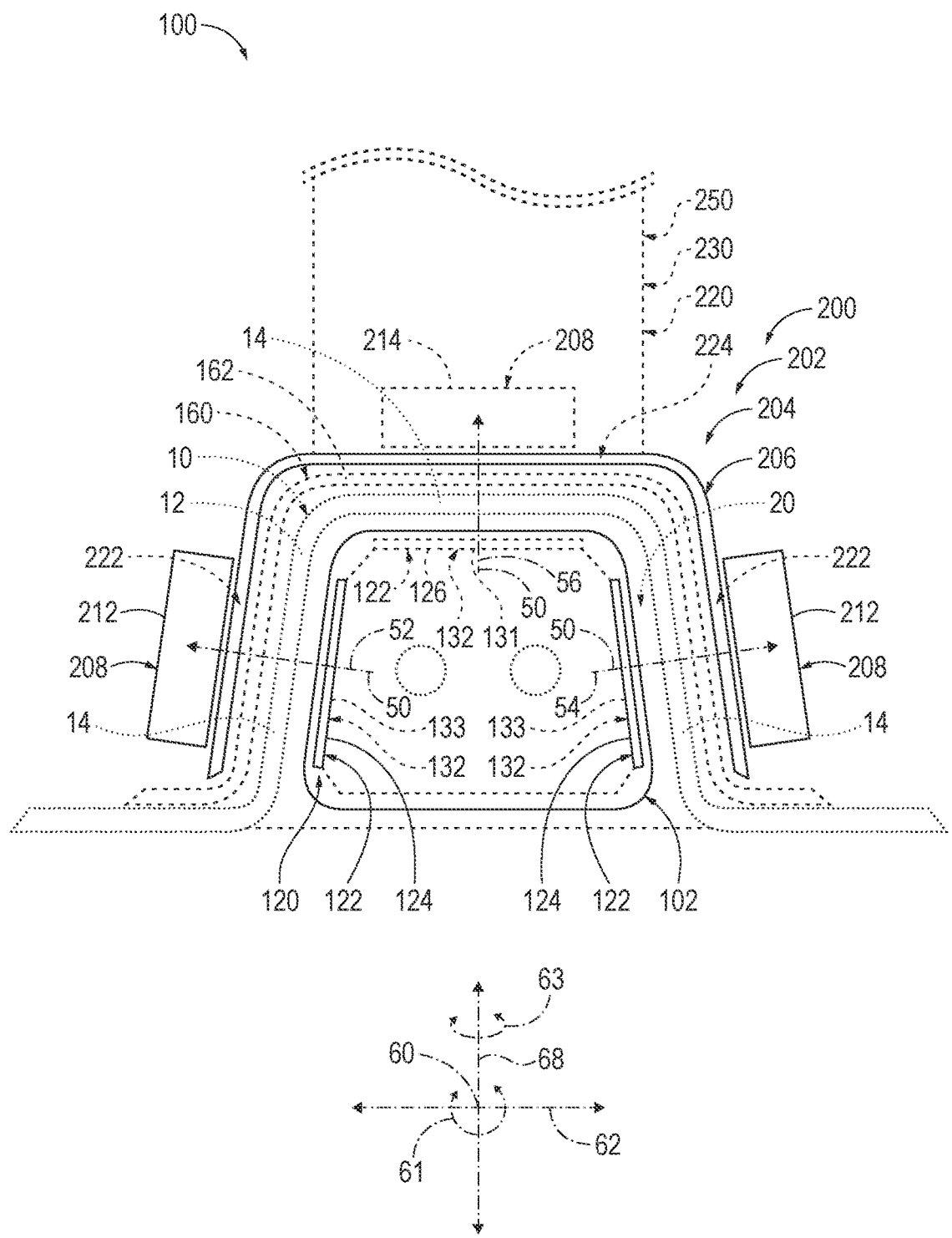
FIG. 3 is a schematic cross-sectional view illustrating examples of magnetic handling systems in a magnetically engaged configuration according to the present disclosure.
Figure 4:
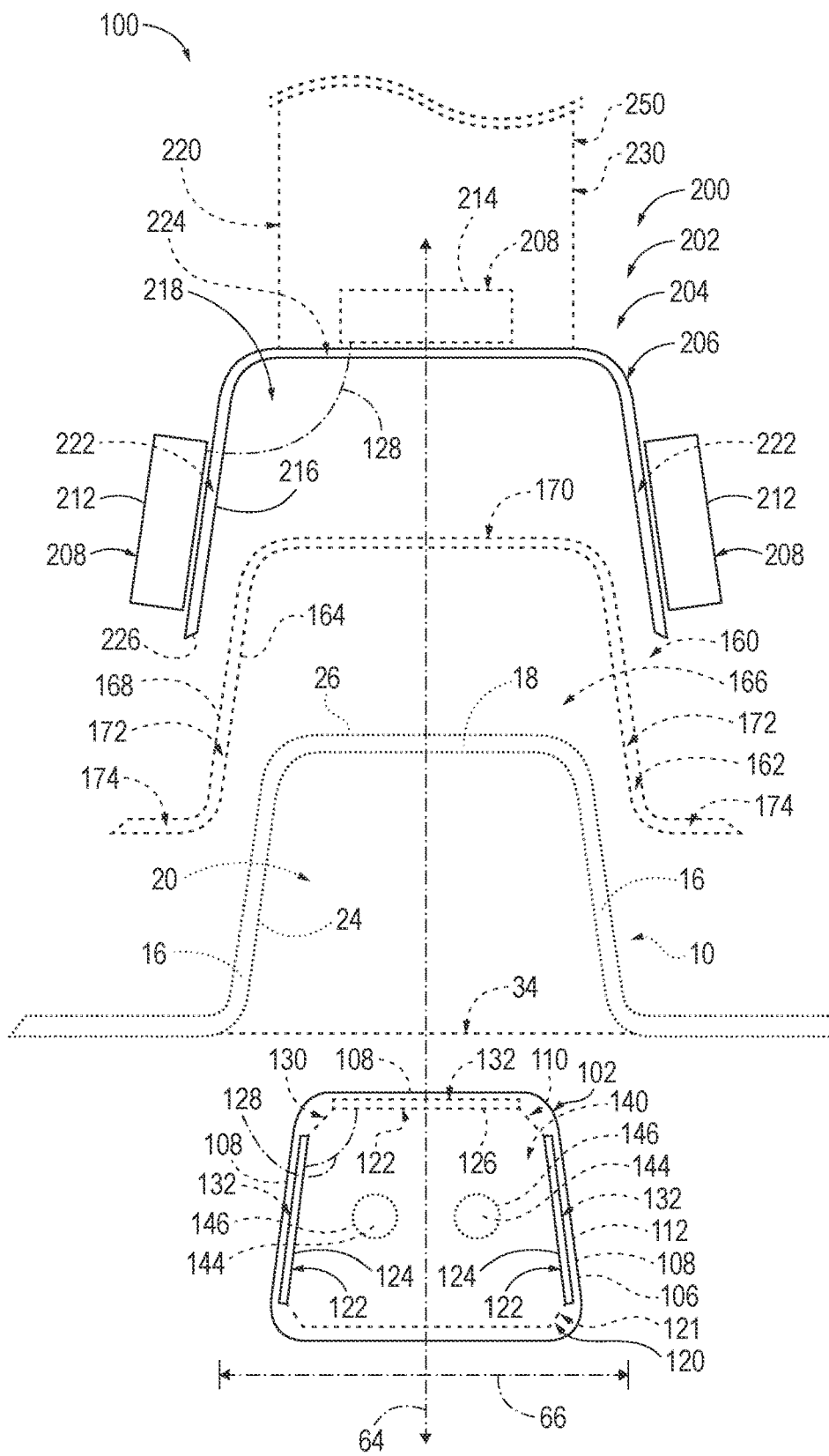
FIG. 4 is a partially exploded cross-sectional view illustrating examples of magnetic handling systems according to the present disclosure.
Figure 5:
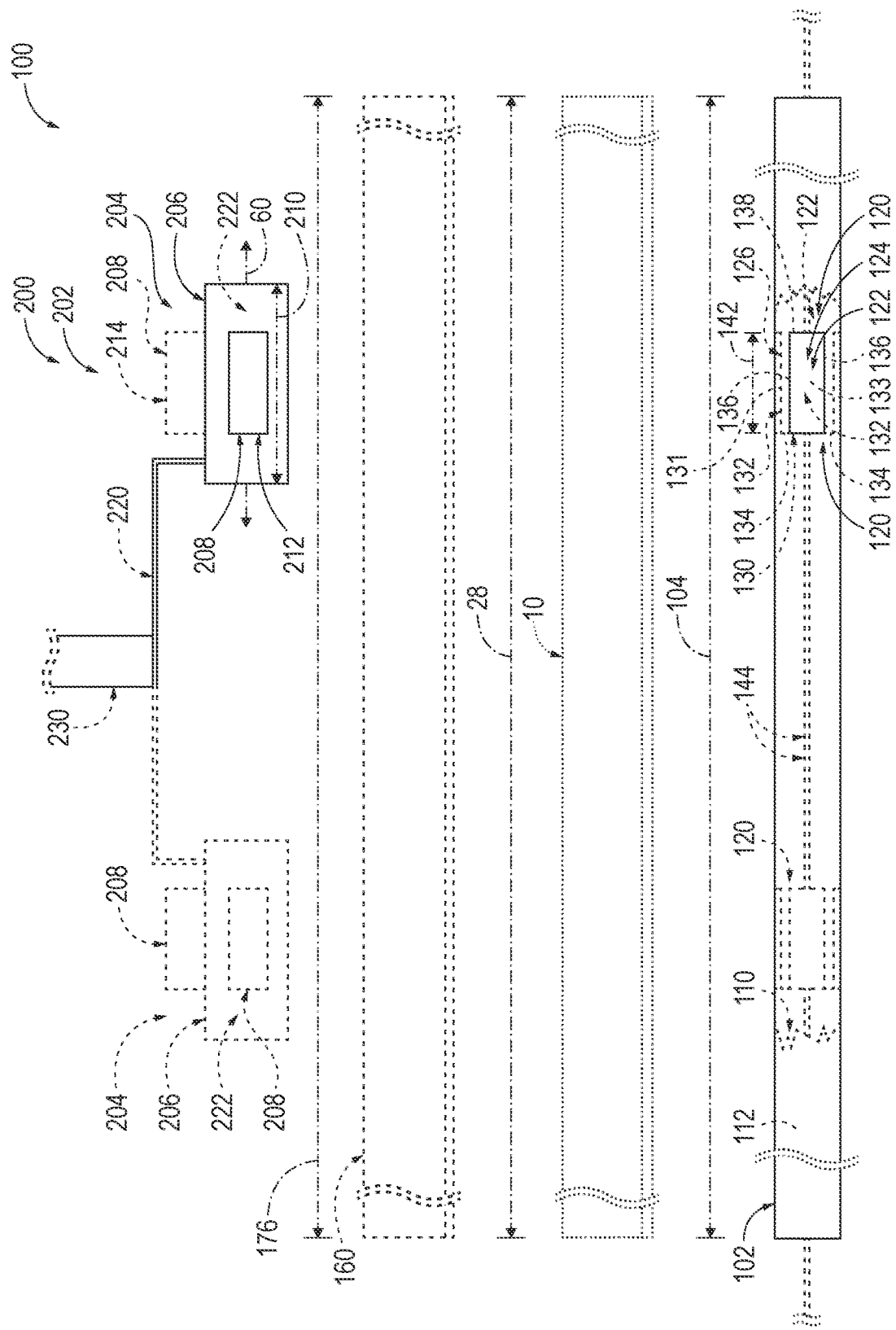
FIG. 5 is a partially exploded schematic side elevation view illustrating examples of magnetic handling systems according to the present disclosure.

FIGS. 3-5 illustrate examples of magnetic handling systems 100 according to the present disclosure. More specifically, FIG. 3 is a schematic cross-sectional view of magnetic handling systems 100 in a magnetically engaged configuration, FIG. 4 is a partially exploded cross-sectional view of magnetic handling systems 100, and FIG. 5 is a schematic, partially exploded side elevation view of magnetic handling systems 100. In FIGS. 3-5, hat stringer 10 is illustrated in dotted lines, indicating that hat stringer 10 is environmental to the illustrated examples of magnetic handling systems 100.

Generally with reference to FIGS. 3-5, magnetic handling systems 100 are configured to handle hat stringers 10 (e.g., the example hat stringers 10 of FIG. 2) that include a wall 12 having a plurality of wall portions 14 that define a stringer interior volume 20. Magnetic handling systems 100 include a bladder 102 that is configured to be received within stringer interior volume 20 and that comprises a magnetic insert 120. Magnetic insert 120 includes a plurality of magnetic walls 122, each being positioned and oriented to extend at least substantially aligned with a respective wall portion 14 of hat stringer 10. Herein, "at least substantially aligned" in this context refers to each magnetic wall 122 extending at least substantially parallel to the respective wall portion 14 and closer to the respective wall portion 14 than any other magnetic wall 122.

Magnetic handling systems 100 also include a magnetic carriage system 200. Magnetic carriage system 200 includes a carriage 202 that is configured to be coupled to a support structure 250 and that includes a magnetic head 204. Magnetic head 204 includes a bracket 206 and a plurality of magnetic sources 208 that are supported by bracket 206. Each magnetic source 208 is configured to magnetically couple with a respective magnetic wall 122 of the magnetic insert 120 to produce an attractive magnetic force 50 therebetween. More specifically, each magnetic source 208 may be positioned and oriented by bracket 206 to magnetically couple with the respective magnetic wall 122 of magnetic insert 120 when bladder 102 is operably received within bracket 206. Accordingly, the plurality of magnetic sources 208 of magnetic head 204 and the plurality of magnetic walls 122 of magnetic insert 120 collectively are configured to produce a plurality of attractive magnetic forces 50 therebetween. As best seen in FIG. 3, magnetic head 204 and magnetic insert 120 are configured such that attractive magnetic forces 50 are oriented along different directions. At least two attractive magnetic forces 50 may be oriented along at least partially opposing directions. Herein, a first direction that is "at least partially opposed to" a second direction means that the first direction has a component that is opposed to, or at 180° relative to, the second direction.

Magnetic head 204 and magnetic insert 120 are described as being magnetically engaged with one another when each magnetic source 208 and the respective magnetic wall 122 are magnetically coupled with one another. More specifically, magnetic head 204 and bladder 102 are configured to receive wall 12 of hat stringer 10 therebetween with each magnetic source 208 of magnetic head 204 and the respective magnetic wall 122 positioned on either side of the respective wall portion 14 of hat stringer 10. In this configuration, magnetic sources 208 and the plurality of magnetic walls 122 collectively are configured magnetically couple with one another to urge bladder 102 against hat stringer 10 to retain the hat stringer 10 within bracket 206 of magnetic head 204. The plurality of attractive magnetic forces 50 may be sufficient to lift and carry hat stringer 10, bladder 102, and optionally a caul 160, such that magnetic handling system 100 may be utilized to place hat stringer 10 in a desired location, such as an installation location on aircraft skin 30. In some examples, configuring magnetic head 204 and magnetic insert 120 to produce a plurality of attractive magnetic forces 50 that are oriented along a plurality of different directions permits magnetic head 204 and bladder 102 to retain hat stringer 10 within bracket 206 against vertical, torsional, and/or skew forces applied to hat stringer 10. As discussed in more detail herein, this configuration also may permit magnetic handling system 100 to manipulate a longitudinal conformation of hat stringer 10, for example, to install hat stringer 10 in an aircraft wing box 74. Magnetic handling system 100 also may perform this manipulation as hat stringer 10 is being lifted and/or carried by magnetic handling system 100 to an installation location. Additionally, in contrast to conventional systems that engage hat stringers by applying an inward force to the exterior of the hat stringer, magnetic handling system 100 is configured to engage hat stringer 10 by applying outward forces to stringer wall interior surface 24 via bladder 102 that are directed towards bracket 206 and inward forces to stringer wall exterior surface 26 via bracket 206 that are directed towards bladder 102. By simultaneously applying opposing forces to stringer wall interior surface 24 and stringer wall exterior surface 26, magnetic handling system 100 is configured to distribute forces more evenly across the thickness of wall 12 of stringer 10 during handling of hat stringer 10 relative to conventional systems which engage hat stringers by applying inward force to the exterior of the hat stringer.

In some examples, bracket 206 defines a bracket interior surface 216 that is shaped correspondingly to a stringer wall exterior surface 26 of hat stringer 10. Bracket interior surface 216 may define a bracket interior volume 218 that is dimensioned to operably receive cap wall portion 18 and sidewall portions 16 of hat stringer 10 therewithin. In some examples, bracket 206 includes a cap bracket portion 224 and a pair of lateral bracket portions 222 that define bracket interior surface 216. More specifically, in such examples, lateral bracket portions 222 extend from either side of cap bracket portion 224 and are oriented transverse to cap bracket portion 224. In some examples, bracket 206 is conformed such that lateral bracket portions 222 extend at least approximately parallel to sidewall portions 16 of hat stringer 10 and cap bracket portion 224 extends at least approximately parallel to cap wall portion 18 of hat stringer 10 when hat stringer 10 is operably received within bracket 206. Herein, "at least approximately parallel to" designates a relationship of within 10 degrees of parallel. In some examples, lateral bracket portions 222 are cantilevered from cap bracket portion 224 such that distal edges 226 of lateral bracket portions 222 are not connected to one another. Bracket interior volume 218 also is open-ended along leading and trailing edges of bracket 206, between which a bracket length 210 of bracket 206 is measured. In this way, bracket interior volume 218 is open along three sides to permit insertion of hat stringer 10 into and removal hat stringer 10 from bracket interior volume 218.

In some examples, bracket interior surface 216 is configured to directly contact and support stringer wall exterior surface 26 of hat stringer 10. Additionally or alternatively, in some examples, magnetic handling system 100 further comprises a caul 160 that is configured to receive stringer wall exterior surface 26 of hat stringer 10 and support hat stringer 10 during handling of hat stringer 10 with magnetic handling system 100. When included in magnetic handling system 100, caul 160 is constructed from any suitable one or more materials. In some examples, caul 160 is constructed from a cured fiber-reinforced composite material. In some such examples, caul wall 162 comprises fewer layers of cured fiber-reinforced composite material than does hat stringer 10, such that caul 160 is more rigid than hat stringer 10 when hat stringer 10 is uncured or partially cured, and less rigid than hat stringer 10 when hat stringer 10 is cured.

In some examples, bracket interior surface 216 is configured to receive a caul wall exterior surface 168 of caul 160, such as with caul 160 receiving stringer wall exterior surface 26 of hat stringer 10. In some such examples, bracket interior surface 216 is dimensioned and shaped corresponding to caul wall exterior surface 168. More specifically, caul 160 comprises a caul wall 162 having a caul wall interior surface 164, and caul wall interior surface 164 defines a caul interior volume 166. Caul 160 is configured to receive hat stringer 10 within caul interior volume 166 with stringer wall exterior surface 26 supported against caul wall interior surface 164. In some examples, caul wall 162 comprises caul wall cap portion 170 and caul wall lateral portions 172 that extend transversely from either side of caul wall cap portion 170. Caul 160 is shaped such that caul wall cap portion 170 extends at least approximately parallel to cap wall portion 18 of hat stringer 10 and caul wall lateral portions 172 extend at least approximately parallel to sidewall portions 16 of hat stringer 10 when hat stringer 10 is received by caul 160. In other words, caul 160 may have at least substantially the same cross-sectional shape as hat stringer 10. In some examples, caul wall 162 includes caul flanges 174 that are configured to directly contact and support flanges 22 of hat stringer 10 when hat stringer 10 is received in caul 160. As discussed with respect to bracket 206, caul interior volume 166 is open ended (e.g., on three sides) to permit insertion and removal of hat stringer 10 into caul interior volume 166.

In some examples, caul wall interior surface 164 is shaped correspondingly to a desired shape of stringer wall exterior surface 26. More specifically, caul 160 defines a caul length 176 that may be the same as, or at least substantially the same as, a stringer length 28 of hat stringer 10. While the cross-sectional shape of caul 160 may be at least substantially uniform along caul length 176, individual cross-sections of caul 160 may be one or more of, twisted, skewed, and/or lofted relative to one another such that a longitudinal shape of caul 160, or the shape of caul 160 along the entirety of caul length 176, is non-linear, twisted, skewed and/or lofted. In some such examples, the longitudinal shape of caul wall interior surface 164 corresponds to a desired longitudinal shape of hat stringer 10 and/or of stringer wall exterior surface 26. In some examples, caul 160 comprises a loft or contour that assists magnetic handing system 100 in imparting a desired loft on the hat stringer 10 when magnetic handling system 100 manipulates hat stringer 10 into a desired stringer longitudinal conformation.

For examples in which magnetic handling system 100 comprises caul 160, magnetic head 204 and bladder 102 are configured to receive caul wall 162 of caul 160 and wall 12 of hat stringer 10 therebetween with hat stringer 10 received within caul interior volume 166. In particular, magnetic head 204 and magnetic insert 120 are configured to magnetically engage one another to urge bladder 102 against hat stringer 10 to retain hat stringer 10 within caul interior volume 166 and to retain caul 160 within bracket 206 of magnetic head 204. In particular, when magnetic insert 120 and magnetic head 204 are magnetically engaged in this configuration, caul 160 is received within bracket interior volume 218 with caul wall exterior surface 168 supported against bracket interior surface 216.

In view of the above, hat stringer 10, bladder 102, caul 160, and/or bracket 206 may have similar cross-sectional shapes (e.g., trapezoidal cross-sectional shapes) to permit nesting of bladder 102, hat stringer 10, caul 160, and bracket 206, as discussed herein. Bladder 102 may be described herein as being operably received within bracket 206 when at least a portion of bladder 102 is positioned within bracket interior volume 218, such as spaced apart from bracket interior surface 216 by wall 12 of hat stringer 10, optionally in addition to caul wall 162 of caul 160. In more general terms, unless otherwise specified, a first element may be described herein as being operably received by a second element or positioned within an interior volume of the second element without requiring the first element be directly supported by the second element and/or without requiring that the entirety of the first element be positioned within the interior volume of the second element.

With continued reference to FIGS. 3-5, each magnetic source 208 is configured to produce a respective magnetic field and each magnetic wall 122 is configured to produce a respective magnetic field. Herein, an element is defined as being configured to produce a respective magnetic field when the element is a permanent magnet (i.e., possesses a permanent magnetic field) or when the element is configured to produce a magnetic field responsive to external stimulus. Thus, magnetic sources 208 may be or include permanent magnets and/or magnetic walls 122 may be or include magnetic permanent magnets. Illustrative, non-exclusive examples of permanent magnets include magnetite, ferrites, rare-earth magnets, neodymium-based magnets, NdFdB magnets, samarium-based magnets, SmCo magnets, and/or alnico magnets. Additionally or alternatively, magnetic sources 208 and/or magnetic walls 122 may be or include electromagnets, which generate a magnetic field responsive to electrical current being passed therethrough. As another example, magnetic sources 208 and/or magnetic walls 122 also may be or include soft magnets, which magnetize in the presence of an external magnetic field to produce a magnetic field but that do not remain permanently magnetized, at least to the same magnitude, when removed from the external magnetic field. Examples of soft magnets include annealed iron, certain iron alloys, and steel. Magnetic source 208 and the respective magnetic wall 122 may be described as forming a magnetic couple. For examples in which one of magnetic source 208 and magnetic wall 122 of a given magnetic couple includes a soft magnet, the other of magnetic source 208 and magnetic wall 122 includes an electromagnet or a permanent magnet that generates the magnetic field needed to magnetize the soft magnet.

In some examples, magnetic sources 208 and/or magnetic walls 122 are configured to be actuated to control the effective pull strength of the magnetic field thereof. In some such examples, actuation of magnetic sources 208 and/or magnetic walls 122 permits hat stringer 10 to be selectively retained within and selectively released from within bracket 206. For examples in which magnetic sources 208 and/or magnetic walls 122 include electromagnets, the magnetic fields thereof are actuated by controlling the electrical current to each electromagnet. In some examples, magnetic sources 208 are configured to be actuated, while magnetic walls 122 include permanent magnets or soft magnets. Such a configuration may be beneficial with regard to the size constraints placed on bladder 102 as compared to carriage 202. As yet another example, each magnetic source 208 may include a physically-actuated magnet, which includes a permanent magnet and an actuator that controls the orientation of the permanent magnet or the distance of the permanent magnet from bracket 206 to control the effective field strength of the permanent magnet with respect to the respective magnetic wall 122. As a more specific example, a physically-actuated magnet may include a rotationally-actuated permanent magnet having an actuator that is configured rotate the permanent magnet into and out of alignment with the respective magnetic wall 122.

Herein, magnetic source 208 and magnetic wall 122 are described as being magnetically coupled with one another when attractive magnetic force 50 is produced therebetween. Attractive magnetic force 50 is regarded as a magnetic dipole-dipole interaction, as will be understood by a person of ordinary skill in the art. The strength of attractive magnetic force 50 varies with respect to the relative orientations of and the separation between magnetic source 208 and magnetic wall 122, with attractive magnetic force 50 reaching a maximum (for given magnetic field magnitudes) as magnetic source 208 and magnetic wall 122 approach magnetic alignment with one another and as the separation therebetween is reduced. More specifically, when magnetized, magnetic source 208 and magnetic wall 122 each comprise a respective north pole and a respective south pole. Magnetic source 208 and magnetic wall 122 are described herein as being magnetically aligned when the magnetic fields of magnetic source 208 and magnetic wall 122 are coaxial and oriented in the same direction, such that opposite poles (e.g., north-south or south-north) of magnetic source 208 and magnetic wall 122 directly face one another. Thus, in some examples, magnetic sources 208 are positioned and oriented by bracket 206 such that magnetic sources 208 are configured to at least substantially magnetically align with magnetic walls 122 when bladder 102 is operably received within bracket 206. As an example, each magnetic source 208 may directly face the respective magnetic wall 122 and be positioned closer to the respective magnetic wall 122 than the other magnetic walls 122 when bladder 102 is operably positioned within bracket 206.

For simplicity, the present disclosure refers to each magnetic source 208 and each magnetic wall 122 as comprising a single magnet or magnetic element. However, it should be understood that magnetic source 208 and/or magnetic wall 122 are not limited to comprising a single magnet or magnetic element, and each magnetic source 208 and/or magnetic wall 122 may include a plurality of magnets or magnetic elements that are configured to cooperatively produce the respective magnetic field and/or the magnetic poles discussed herein with respect to magnetic source 208 and magnetic wall 122.

As seen in FIG. 5, bladder 102 defines a bladder length 104, where, bladder length 104 may be at least approximately parallel to stringer length 28 of hat stringer 10 when bladder 102 is received within stringer interior volume 20. In some examples, magnetic insert 120 is dimensioned and is oriented within bladder 102 such that each magnetic wall 122 and/or the magnetic poles thereof extend at least approximately parallel to bladder length 104. In other words, magnetic insert 120 defines an insert length 142 and, in some examples, magnetic insert 120 is positioned and oriented within bladder 102 such that insert length 142 is at least approximately parallel to bladder length 104. Similarly, bracket 206 of magnetic head 204 defines bracket length 210 and, in some examples, each magnetic source 208 is positioned with respect to bracket 206 such that the magnetic poles thereof extend at least approximately parallel to bracket length 210. In some examples, bracket length 210 of magnetic head 204 is at least approximately parallel to bladder length 104 and/or at least approximately parallel to insert length 142 when magnetic head 204 is magnetically engaged with magnetic insert 120 and bladder 102 is operably received within bracket 206.

As discussed in more detail herein, in some examples, hat stringer 10 comprises a non-linear longitudinal conformation, such that stringer length 28 of hat stringer 10 likewise is non-linear as it follows this non-linear longitudinal conformation. Accordingly, in some examples, bladder length 104 of bladder 102 also is non-linear. However, in such examples, bladder length 104 of bladder 102 and/or stringer length 28 of hat stringer 10 may be regarded as being locally linear, such as on the scale of bracket length 210 and/or insert length 142. In other words, insert length 142 is described herein as being at least approximately parallel to bladder length 104 with respect to the section of bladder 102 in which magnetic insert 120 is received, and not necessarily the entire of bladder length 104 of bladder 102. Likewise, bracket length 210 is described herein as being at least substantially parallel to bladder length 104 with respect to the section of bladder 102 that bracket 206 operably receives (i.e., that corresponds to magnetic insert 120) and not necessarily the entirety of bladder length 104.

As perhaps best seen in FIG. 4, bracket 206 and bladder 102 each define a respective width 66 and a centerline 64 that is normal to and that bisects width 66. Centerline 64 also extends normal to bracket length 210 in bracket 206 and normal to bladder length 104 in bladder 102. In some examples, centerline 64 of bracket 206 and centerline of bladder 102 are at least approximately aligned with one another when magnetic head 204 is magnetically engaged with magnetic insert 120 and bladder 102 is operably received within bracket 206.

With continued reference to FIGS. 3-5, in some examples, magnetic walls 122 of magnetic insert 120 include a pair of lateral magnetic walls 124 that are respectively positioned and oriented to extend at least substantially aligned with sidewall portions 16 of hat stringer 10 and/or with lateral bracket portions 222 of bracket 206. In some examples, lateral magnetic walls 124 extend at least substantially parallel to insert length 142 and are oriented at a lateral face angle relative to one another, with examples of the lateral face angle including 0°, at least 5°, at least 8° at least 10°, at least 12°, at least 15°, at least 20°, at most 8°, at most 10°, at most 12°, at most 15°, at most 20°, and/or at most 30°. In some examples, magnetic sources 208 of magnetic head 204 include a pair of lateral magnetic sources 212 that are respectively configured to magnetically couple with lateral magnetic walls 124 of magnetic insert 120. More specifically, when bladder 102 is received in stringer interior volume 20 and hat stringer 10 is operably received in bracket 206, each lateral magnetic source 212 and the respective lateral magnetic wall 124 may be positioned on either side of a respective sidewall portion 16 of hat stringer 10 such that attractive magnetic force 50 produced therebetween is directed through the respective sidewall portion 16. In some examples, attractive magnetic force 50 produced between lateral magnetic wall 124 and lateral magnetic source 212 is at least substantially normal to the respective sidewall portion 16 of hat stringer 10. In some examples, lateral magnetic sources 212 are mounted on lateral bracket portions 222 of bracket 206. In some such examples, attractive magnetic forces 50 between lateral magnetic sources 212 and lateral magnetic walls 124 urge sidewall portions 16 against lateral bracket portions 222 of bracket 206 or against caul wall lateral portions 172 for examples in which magnetic handling system 100 includes caul 160.

As perhaps best seen in FIG. 3, in some examples, a first magnetic couple is formed between a first lateral magnetic wall 124 and a first lateral magnetic source 212, and a second magnetic couple is formed between a second lateral magnetic wall 124 and a second lateral magnetic source 212. In some examples, attractive magnetic force 50 between the first magnetic couple is oriented along a first direction 52 that is at least partially, and optionally at least substantially, opposed to a second direction 54 along which attractive magnetic force 50 between the second magnetic couple is directed. In some examples, configuring the magnetic couples of magnetic head 204 and magnetic insert 120 in this manner permits bladder 102 and magnetic head 204 to retain hat stringer 10 therebetween against torsional and/or skew forces applied to hat stringer 10.

In some examples, magnetic walls 122 of magnetic insert 120 further include a cap magnetic wall 126 that is positioned and oriented to extend at least substantially aligned with cap wall portion 18 of hat stringer 10 when bladder 102 is received in hat stringer 10 and/or with cap bracket portion 224 of bracket 206 when bladder 102 is operably received in bracket 206. In some examples, lateral magnetic wall 124 is oriented at a cap-to-lateral face angle 128 relative to the cap magnetic wall 126, with examples of the cap-to-lateral face angle 128 including at least 90°, at least 100°, at least 110°, at least 120°, at least 130°, at least 140°, at most 100°, at most 110°, at most 120°, at most 130°, at most 140°, and/or at most 160°. Typically, lateral magnetic walls 124 are oriented at the same cap-to-lateral face angle 128 and/or extend symmetrically relative to cap magnetic wall 126. In some examples, cap-to-lateral face angle 128 is at least approximately the same as (i.e., within 10 degrees of) sidewall angle 32 discussed herein with reference to FIG. 2.

For some examples in which magnetic insert 120 includes cap magnetic wall 126, magnetic sources 208 of magnetic head 204 further includes a cap magnetic source 214 that is configured to magnetically couple with cap magnetic wall 126 of magnetic insert 120. In some examples, a magnetic pole of each lateral magnetic source 212 is oriented at a cap-to-lateral pole angle 228 relative to a magnetic pole of cap magnetic source, where cap-to-lateral pole angle 228 may be the same as cap-to-lateral face angle 128. In some examples, cap magnetic source 214 is mounted on cap bracket portion 224 and/or a magnetic pole thereof extends at least approximately parallel to bracket interior surface 216 along cap bracket portion 224.

As perhaps best seen in FIG. 3, cap magnetic wall 126 and cap magnetic source 214 may form a third magnetic couple, where attractive magnetic force 50 produced therebetween is oriented along a third direction 56 that is at least partially normal to, and optionally at least substantially normal to, first direction 52 and second direction 54. Herein, "at least partially normal to" as applied to a direction relative to another direction means that the direction has a component that is normal to the second direction. In some examples, cap magnetic wall 126 and cap magnetic source 214 are positioned on either side of cap wall portion 18 of hat stringer 10 when bladder 102 is received within stringer interior volume 20 and hat stringer 10 is operably received within bracket 206. In other words, in some examples, third direction 56 extends through cap wall portion 18 of hat stringer 10, and optionally normal to cap wall portion 18 of hat stringer 10. In some examples, attractive magnetic force 50 between cap magnetic wall 126 and cap magnetic source 214 retains hat stringer 10 within bracket 206 against vertical forces (e.g., gravitational forces) applied to hat stringer 10.

With continued reference to FIGS. 3-5, bladder 102 includes a bladder exterior surface 106, and bladder exterior surface 106 may be shaped and dimensioned correspondingly to stringer wall interior surface 24 such that bladder exterior surface 106 directly contacts and supports stringer wall interior surface 24 when bladder 102 is received within stringer interior volume 20. More specifically, bladder 102 may be configured to support hat stringer 10 in the desired shape by contacting and supporting stringer wall interior surface 24. In other words, in some examples, bladder 102 defines a desired shape of stringer interior volume 20 and/or bladder exterior surface 106 defines a desired shape of stringer wall interior surface 24.

In some examples, bladder 102 is configured to contact and support stringer wall interior surface 24 along at least a substantial portion of, and optionally the entirety of, stringer length 28 of hat stringer 10. Accordingly, bladder length 104 of bladder 102 may be similar to, and optionally greater than stringer length 28, and the cross-sectional shape and dimensions of bladder 102 may be at least substantially uniform along bladder length 104. In some examples, bladder exterior surface 106 defines a plurality of bladder exterior surface portions 108 corresponding to and/or that are configured to at least approximately align with respective wall portions 14 of hat stringer 10. In some examples, each magnetic wall 122 of magnetic insert 120 is at least approximately aligned with a respective bladder exterior surface portion 108 of bladder exterior surface 106.

Bladder 102 may include any suitable construction. In some examples, bladder 102 comprises a bladder body 110 that defines bladder exterior surface 106 and/or that fills the space bounded by bladder exterior surface 106. In such examples, bladder 102 may be described as having a monolithic, solid, or space-filling construction. In some such examples, bladder 102 additionally or alternatively may be referred to as a mandrel. In some examples, bladder body 110 is formed of a flexible, elastic, pliable, and/or resilient material to permit manipulation of the longitudinal shape of hat stringer 10 with bladder 102 received in hat stringer 10, as discussed in more detail herein. Examples of suitable materials for forming bladder body 110 include a resilient material, a plastic, a rubber, a silicone, an elastomer, latex, nitrile rubber, a polyurethane foam, etc.

In other examples, bladder 102 includes a bladder sleeve 112 that comprises bladder exterior surface 106 and that is configured to encompass a hollow interior volume. In other words, bladder sleeve 112 may be described as being tubular, or at least configured to adopt a tubular shape. In some examples, bladder sleeve 112 is constructed to be freestanding, such that bladder sleeve 112 maintains the desired shape of bladder exterior surface 106 under its own weight. Additionally or alternatively, in some examples, magnetic insert 120 is configured to support bladder sleeve 112 in a desired bladder conformation and/or bladder sleeve 112 is configured to be pressurized to adopt the desired bladder conformation. In some such examples, magnetic walls 122 of magnetic insert 120 are configured to contact an interior of bladder sleeve 112 and support bladder sleeve 112 such that bladder exterior surface 106 forms bladder exterior surface portions 108, as discussed herein. Examples of suitable materials for forming bladder sleeve 112 include a halogenated polymer, a fluoro-polymer, polyurethane, thermoplastic polyurethane, a siloxane, etc.

In any such examples, magnetic insert 120 may be disposed within bladder 102 such that bladder exterior surface 106 surrounds magnetic insert 120 and/or interposes magnetic insert 120 and stringer wall interior surface 24 when bladder 102 is received in stringer interior volume 20. Accordingly, magnetic insert 120 may be described as being configured to urge bladder exterior surface portions 108 against stringer wall interior surface 24 when bladder 102 is received within stringer interior volume 20 and magnetic insert 120 is magnetically engaged with magnetic head 204.

As discussed in more detail herein with reference to FIG. 5, bladder 102 typically includes a plurality of magnetic inserts 120 that are spaced apart from one another along bladder length 104 and that are configured to magnetically engaged with a respective plurality of magnetic heads 204 of magnetic carriage system 200.

Each magnetic insert 120 may include any suitable construction, which in some examples, is selected based at least in part on the construction of bladder 102. For some examples in which bladder 102 includes bladder body 110, magnetic insert 120 is engulfed by and suspended within bladder body 110, such as by molding or casting bladder body 110 with magnetic insert 120 positioned therein. In such examples, magnetic insert 120 may be constructed as a single piece, in which magnetic walls 122 are joined with one another, or magnetic walls 122 may be separate from one another and suspended within bladder body 110.

For some examples in which bladder 102 includes bladder sleeve 112, magnetic inserts 120 are flared magnetic inserts 121, which are configured to be selectively inserted into and removed from bladder sleeve 112. More specifically, flared magnetic insert 121 includes a nose wall 130 and a plurality of flaps 132 that are cantilevered from nose wall 310. Each flap 132 includes or defines a respective magnetic wall 122. More specifically, flaps 132 may include a pair of lateral flaps 133 that include or define lateral magnetic walls 124 and a cap flap 131 that includes or defines cap magnetic wall 126. In some examples, flaps 132 are configured to support bladder sleeve 112 in the desired bladder conformation, at least along the respective flared magnetic insert 121, as discussed herein.

Nose wall 130 defines a leading end of flared magnetic insert 121 and each flap 132 includes a leading edge 134 along which flap 132 is cantilevered from nose wall 130. Each flap 132 projects rearwardly from nose wall 130 and extends along insert length 142 of flared magnetic insert 121. Flaps 132 collectively define an insert interior space 140 of flared magnetic insert 121. In some examples, a leading portion of flap 132, or the a portion nearest to nose wall 130, is angled outwardly from nose wall 130 such that a cross-sectional area of insert interior space 140 is greater or increases away from nose wall 130. In other words, a leading portion of each flap 132 may be flared outwardly from nose wall 130. The remainder of each flap 132 may include magnetic wall 122 and may be configured to extend at least substantially aligned with the respective wall portion 14 of hat stringer 10 and/or at least approximately parallel to insert length 142.

In some examples, flared magnetic insert 121 is configured to be inserted into, and moved through, bladder sleeve 112 oriented with nose wall 130 first followed by a remainder of flared magnetic insert 121. In some examples, the flared configuration of flaps 132 facilities insertion of flared magnetic insert 121 into, and movement of flared magnetic insert 121 through, bladder 102 with nose wall 130 leading in the direction of insertion or movement. In some examples, each flap 132 is deflectingly cantilevered from nose wall 130, such as to facilitate insertion and selective movement of flared magnetic insert 121 through bladder sleeve 112. More specifically, in some examples, each flap 132 is biased towards a nominal orientation in which flaps 132 may be positioned to engage the interior of bladder sleeve 112. In some such examples, each flap 132 is configured to resiliently deflect inwardly from the nominal orientation, such as towards insert interior space 140, and may facilitate insertion of flared magnetic insert 121 into and movement of flared magnetic insert 121 through bladder sleeve 112.

As mentioned, in some examples, bladder 102 includes a plurality of magnetic inserts 120 distributed along bladder length 104 of bladder 102. For some examples in which bladder 102 comprises bladder sleeve 112, and magnetic inserts 120 are flared magnetic inserts 121, bladder 102 further includes at least one handling cable 144, and optionally a pair of handling cables 144, that extend through bladder sleeve 112, that interconnect the plurality of flared magnetic inserts 121 to one another, and that project outwardly from either end of sleeve 112. Accordingly, each handling cable 144 may have a length that is greater than bladder length 104. As discussed in more detail herein, in some examples, handling cable(s) 144 are utilized to lift and transport hat stringer 10 when bladder 102 is received within stringer interior volume 20. For some examples in which bladder 102 includes handling cable(s) 144, each flared magnetic insert 121 comprises a cable receiver 146 for receiving each handling cable 144 and coupling flared magnetic insert to handling cable(s) 144. In some examples, cable receiver(s) 146 are comprised in and/or attached to nose wall 130 and handling cable(s) 144 extend through insert interior space 140 when received by cable receivers 146. In some examples, handling cable(s) 144 also are configured to be utilized to position flared magnetic inserts 121 within bladder sleeve 112, as discussed in more detail herein.

Figure 6:
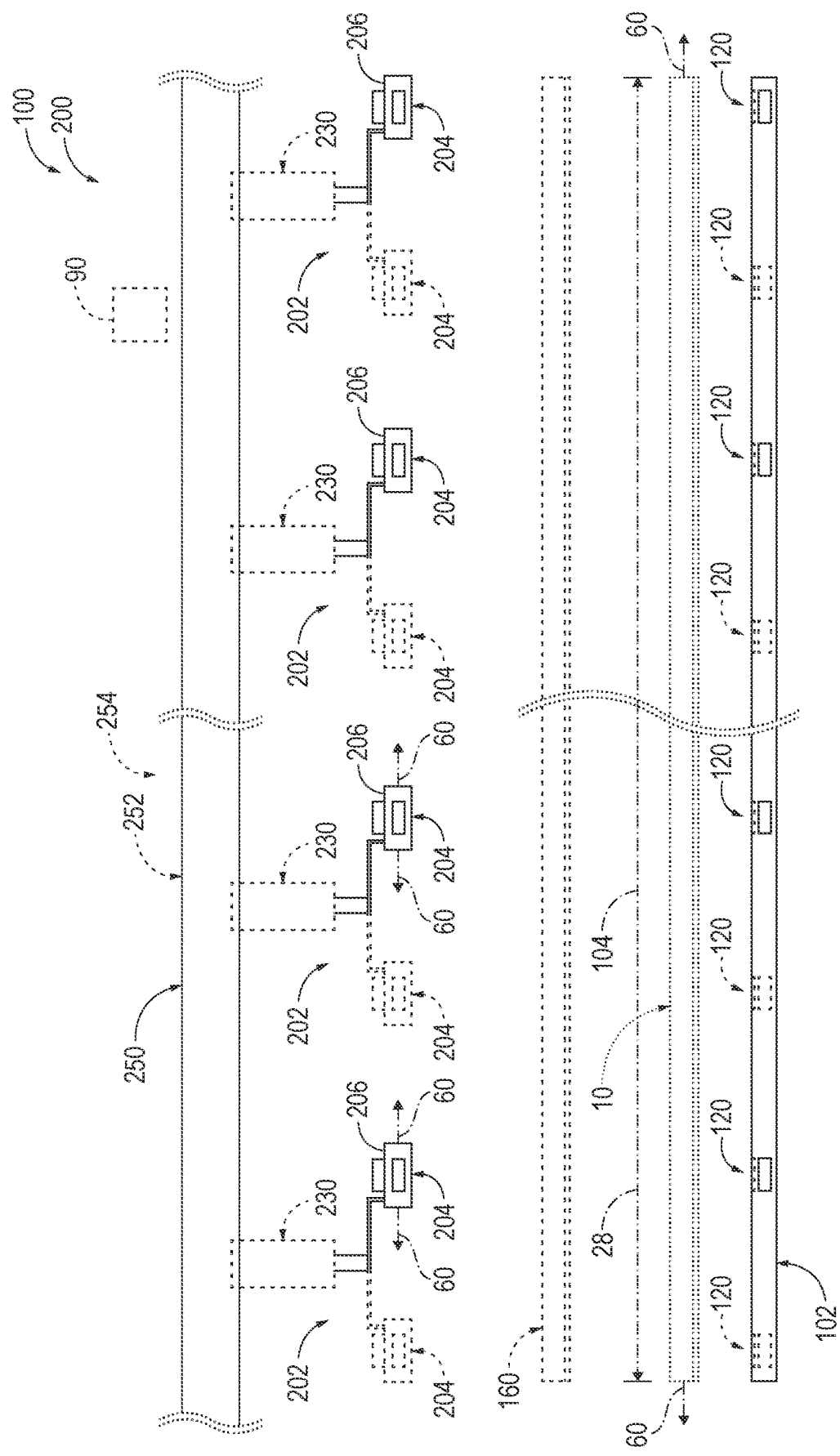
FIG. 6 is a partially exploded side elevation view illustrating additional examples of magnetic handling systems according to the present disclosure.

FIG. 6 is a partially exploded, side elevation view schematically representing examples of magnetic handling system 100 in which magnetic carriage system 200 comprises a plurality of carriages 202 and bladder 102 comprises a respective plurality of magnetic inserts 120 distributed along bladder length 104 of bladder 102. Focusing on the examples of FIG. 6, but with continued reference to FIGS. 3-5, each carriage 202 is operatively coupled to and supported by support structure 250. In some examples, carriages 202 are suspended, or project downwardly from support structure 250, with support structure 250 supporting carriages spaced above a ground or support surface. As examples, carriages 202 may be mounted on a guide frame 252, such as a rail, and guide frame 252 may be comprised in a gantry system and/or a robotic positioning assembly 254. In some examples, the position of carriages 202 along guide frame 252 is adjustable to permit magnetic handling systems 100 to handle hat stringers 10 of different stringer length 28.

Magnetic heads 204 of magnetic carriage system 200 may be spaced apart from one another along guide frame 252 according to a spacing between magnetic inserts 120 of bladder 102, such that each magnetic head 204 is operable to magnetically engage a respective magnetic insert 120 of bladder 102. As examples, bladder 102 may include, on average, at least 5 magnetic inserts 120 per 10 meters of bladder length 104, at least 6 magnetic inserts 120 per 10 meters of bladder length 104, at least 8 magnetic inserts 120 per 10 meters of bladder length 104, at least 11 magnetic inserts 120 per 10 meters of bladder length 104, at least 12 magnetic inserts 120 per 10 meters of bladder length, at least 14 magnetic inserts 120 per 10 meters of bladder length, at most 1 magnetic inserts 120 per meter of bladder length 104, at most 11 magnetic inserts 120 per 10 meters of bladder length 104, at most 12 magnetic inserts 120 per 10 meters of bladder length, at most 14 magnetic inserts 120 per 10 meters of bladder length, and/or at most 2 magnetic inserts 120 per meter of bladder length 104.

In some examples, each magnetic head 204 is supported by a respective carriage 202, or each carriage 202 supports a single magnetic head 204. In other examples, each carriage 202 supports a plurality of magnetic heads 204, such as a pair of magnetic heads 204. As shown in FIG. 5, for examples in which carriage 202 supports a plurality of magnetic heads 204, carriage 202 includes a chassis 220 that supports magnetic heads 204 relative to one another, such as in a coaxial relationship, and that is configured to operably connect magnetic heads 204 to support structure 250. In some examples, magnetic heads 204 that are included in a common carriage 202 are spaced closer to one another than magnetic heads 204 on separate, but adjacent, carriages 202. In such examples, magnetic inserts 120 of bladder 102 are spaced correspondingly along bladder length 104.

As mentioned, magnetic handling system 100 may be configured to manipulate hat stringer 10 into a desired hat stringer longitudinal conformation. The desired longitudinal conformation of hat stringer 10 may be dictated by the conformation of a section of aircraft skin 30 along which hat stringer 10 is to be installed. In some examples, such when hat stringer 10 is to be installed within a wing box 74, the installation location of hat stringer 10 along aircraft skin 30 is non-planar, curved, twisted, lofted, and/or contoured. Thus, the desired stringer longitudinal conformation may be non-linear, twisted, skewed, and/or lofted. More specifically, in the desired stringer longitudinal conformation, the cross-sectional shape of hat stringer 10 may be at least substantially uniform along stringer length 28, but individual cross-sections of hat stringer 10 may be one or more of, twisted, skewed, and/or lofted relative to one another. Magnetic handling system 100 may be configured to manipulate hat stringer 10 into the desired stringer longitudinal conformation and subsequently place hat stringer 10 on the installation location of hat stringer 10 with hat stringer 10 conformed in the desired stringer longitudinal conformation by magnetic handling system 100.

Referring again to FIG. 6, magnetic carriage system 200 further may include a plurality of robotic arms 230 that operatively interconnect carriages 202 to support structure 250. Each robotic arm 230 is configured to control the position and orientation of a respective carriage 202, and accordingly, control the position and orientation of each magnetic head 204 comprised in the respective carriage 202.

More specifically, via robotic arms 230, magnetic carriage system 200 is configured to control the position and orientation of magnetic heads 204 relative to, and/or independently of, one another to arrange magnetic heads 204 along a path that corresponds to a desired longitudinal shape of hat stringer 10. Accordingly, when hat stringer 10 is operably retained by magnetic handling system 100 (i.e., bladder 102 is received within stringer interior volume 20, and each magnetic head 204 is magnetically engaged with the respective magnetic insert 120 such that hat stringer 10 is operably retained within brackets 206), magnetic carriage system 200 is configured to manipulate hat stringer 10 into the desired stringer longitudinal conformation by controlling the positions and orientations of carriages 202, and thereby magnetic heads 204, relative to one another.

More specifically, as shown between FIGS. 3 and 5, each magnetic head 204 defines a longitudinal axis 60, a lateral axis 62 that is perpendicular to longitudinal axis 60, and an azimuthal axis 68 that is perpendicular to longitudinal axis 60 and lateral axis 62. In some examples, longitudinal axis 60 extends centrally through bracket interior volume 218 and parallel to bracket length 210, lateral axis 62 extends parallel to cap bracket portion 224, and azimuthal axis 68 extends normal to cap bracket portion 224. Hat stringer 10 also may define longitudinal axis 60, lateral axis 62, and azimuthal axis 68, with longitudinal axis 60 extending parallel to stringer length 28 and centrally through stringer interior volume 20, with lateral axis parallel to flanges 22, and with azimuthal axis 68 perpendicular to cap wall portion 18. In some examples, the respective axes defined by magnetic head 204 and hat stringer 10 are aligned, or at least approximately aligned, when hat stringer 10 is operably received in bracket 206 and/or retained by magnetic head 204 and bladder 102.

In some examples, robotic arm 230 is configured to apply a force to magnetic head 204 along lateral axis 62, such as to translate magnetic head 204 along lateral axis 62, and/or apply a force to magnetic head 204 along azimuthal axis 68 such as to translate magnetic head along azimuthal axis 68. In some examples, robotic arm 230 is configured to apply a twist torque 61 to magnetic head 204, which urges rotation of magnetic head 204 about longitudinal axis 60, and/or a yaw torque 63 to magnetic head, which urges rotation of magnetic head 204 about azimuthal axis 68. When hat stringer 10 is operably retained by magnetic handling system 100, twist torque 61 applied to magnetic head 204 may urge the retained section of hat stringer 10 to rotate about longitudinal axis 60, or apply twist to hat stringer 10, when the magnetic head 204 is rotated about longitudinal axis 60 relative to at least one adjacent magnetic head 204. Similarly, application of force to magnetic head 204 along azimuthal axis 68 may apply loft or contour to hat stringer 10, such that the retained of hat stringer 10 is offset along azimuthal axis 68 relative to at least one other portion of hat stringer 10. As additional examples, application of yaw torque 63 and/or force about lateral axis 62 to magnetic head 204 may apply skew to hat stringer 10, such that the retained section hat stringer 10 is offset along lateral axis 62 relative to at least one other portion of hat stringer 10. In some examples, magnetic handling system 100 is configured to manipulate hat stringer 10 into the desired stringer longitudinal conformation by positioning magnetic heads 204 along a plurality of coordinate points corresponding to respective locations of the desired hat stringer longitudinal conformation, and orienting each magnetic head 204 such that its axes are at least approximately aligned with respective axes defined by a virtual hat stringer in the desired hat stringer longitudinal conformation.

In some examples, applying twist, skew, and/or loft to a hat stringer can result in compression being applied to certain regions of the wall 12 of the hat stringer 10 and tension being applied to other regions of the wall of the hat stringer that may be opposed to the regions of wall that are under compression. With this in mind, in some examples, magnetic handling system 100 is configured to apply tension to hat stringer 10 along stringer length 28 such as reduce compression in wall 12 of hat stringer and/or to prevent wrinkling of hat stringer 10. In particular, in some examples, magnetic handling system 100 is configured to maintain tension in hat stringer 10 along stringer length 28 as magnetic handling system 100 applies twist, skew, and/or loft to hat stringer 10. In some examples, magnetic handling system 100 is configured to relieve compression in wall 12 and prevent wrinkling in hat stringer 10 by applying this tension evenly across the thickness of wall 12. More specifically, simultaneous application of outward forces to stringer wall interior surface 24 and inward forces to stringer wall exterior surface 24 by each magnetic head 204 and the corresponding magnetic insert 120 may permit magnetic handling system 100 to apply this tension evenly across the wall of hat stringer 10.

In some examples, magnetic handling system 100 is configured to apply tension to hat stringer 10 along stringer length 28 by increasing the spacing between adjacent carriages 202 with hat stringer 10 operably retained by magnetic handling system 100. Increasing the spacing between adjacent carriages 202 with hat stringer 10 operably retained by magnetic handling system 100 urges the retained sections of hat stringer 10 away from one another, thereby applying tension to hat stringer 10. In some examples, robotic arm 230 is configured to apply a force to the respective carriage 202 to translate carriage 202 along longitudinal axis 60 away from adjacent carriages 202 and thereby apply tension to hat stringer 10 along stringer length 28.

In view of the above, magnetic engagement of each magnetic head 204 and the respective magnetic insert 120 may be operable, or configured, to retain hat stringer 10 therebetween against not only the weight of hat stringer 10, but also against various torques (e.g., yaw torque 63 and/or twist torque 61), forces (e.g., along azimuthal axis 68 and/or lateral axis 62), and tension (e.g., along stringer length 28) that are applied to hat stringer 10 when magnetic handling system 100 manipulates hat stringer 10 into the desired hat stringer longitudinal conformation. The ability of each magnetic head 204 and the respective magnetic insert 120 to retain hat stringer 10 therebetween is afforded by the plurality of attractive magnetic forces 50 produced between magnetic head 204 and the respective magnetic insert 120 and their orientation along a plurality of at least partially opposed and/or normal directions. In some examples, the magnitude of each attractive magnetic force 50 is selected based upon factors including a degree of manipulation to be applied to hat stringer 10, an average number of plies that form hat stringer 10, stringer length 28, a total mass of hat stringer 10, and/or the spacing between magnetic inserts 120, and correspondingly, the spacing between magnetic heads 204.

With continued reference to FIG. 6, in some examples, magnetic handling system 100 comprises a controller 90 that is configured and/or programmed to control operation of at least a portion of magnetic handling system 100. As examples, controller 90 may be in communication with one or more components or systems of magnetic handling system 100 and be configured to send one or more control signals to the one or more components of magnetic handling system 100 to control the operation thereof. In some examples, controller is in communication with one or more sensors comprised in magnetic handling system 100 and is configured to issue command signals to the one or more components based on the sensor signals received from the one or more sensors. In some examples, controller 90 is in communication with and configured to control magnetic sources 208 of each magnetic head 204, such as to actuate each magnetic source 208 to control the pull strength of magnetic source 208. In some examples, controller 90 is configured to control each robotic arm 230 to control the position and orientation of the respective magnetic heads 204, as discussed herein. In some examples, controller 90 is configured to actuate robotic positioning assembly 254 to control the position and orientation of guide frame 252 and/or carriages 204 as an array.

Controller 90 may include and/or be any suitable structure, device, and/or devices that may be adapted, configured, designed, constructed, and/or programmed to perform the functions discussed herein. As examples, controller 90 may include one or more of an electronic controller, a dedicated controller, a special-purpose controller, a personal computer, a special-purpose computer, a display device, a logic device, a processing unit, a memory device, and/or a memory device having computer-readable storage media.

The computer-readable storage media, when present, also may be referred to herein as non-transitory computer-readable storage media. This non-transitory computer-readable storage media may include, define, house, and/or store computer-executable instructions, programs, and/or code. When executed by the processing unit, these computer-executable instructions may direct controller 90 to operate magnetic handling system 100 to perform any suitable portion, or subset, of methods 500. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

Turning now to FIGS. 7-12, illustrative non-exclusive examples of magnetic handling systems 100, carriages 202 of magnetic handling systems 100, bladders 102 of magnetic handling systems 100, and hat stringers 10 are provided. Where appropriate, the reference numerals from the schematic illustrations of FIGS. 2-6 are used to designate corresponding parts of FIGS. 7-12; however, the examples of FIGS. 7-12 are non-exclusive and do not limit magnetic handling systems 100 to the illustrated embodiments of FIGS. 7-12. That is, magnetic handling systems 100 are not limited to the specific embodiments illustrated and discussed herein with reference to FIGS. 7-12, and magnetic handling systems 100 may incorporate any number of the various aspects, configurations, characteristics, properties, etc. of magnetic handling systems 100 that are illustrated in and discussed with reference to the schematic representations of FIGS. 2-6 and/or the embodiments of FIGS. 7-12, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 7-12; however, it is within the scope of the present disclosure that the previously discussed features, variants, etc. may be utilized with the examples of FIGS. 7-12.

Figure 7:
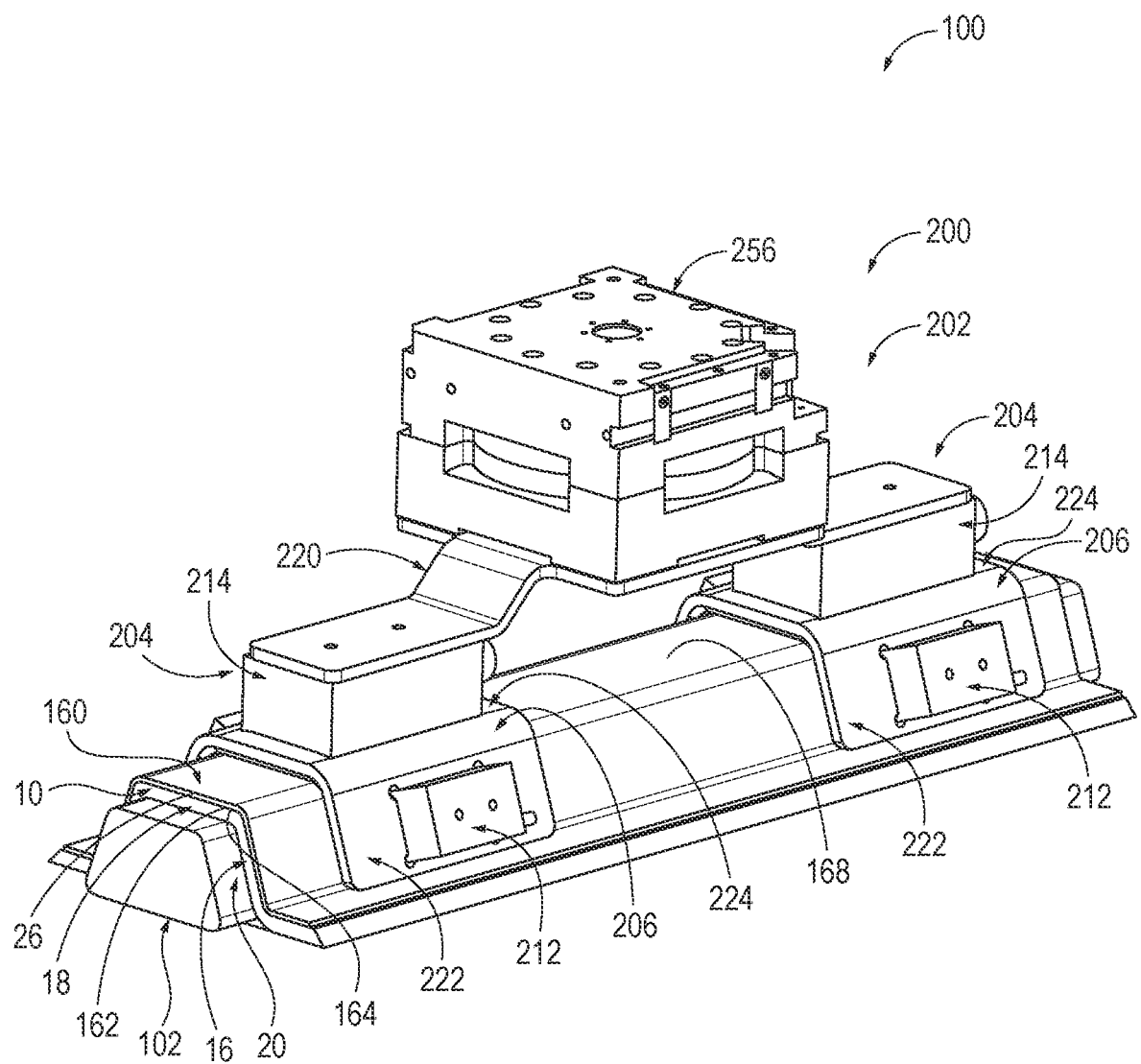
FIG. 7 is an isometric view illustrating an example magnetic handling system with a carriage and a section of a bladder thereof magnetically engaged with one another according to the present disclosure.
Figure 8:
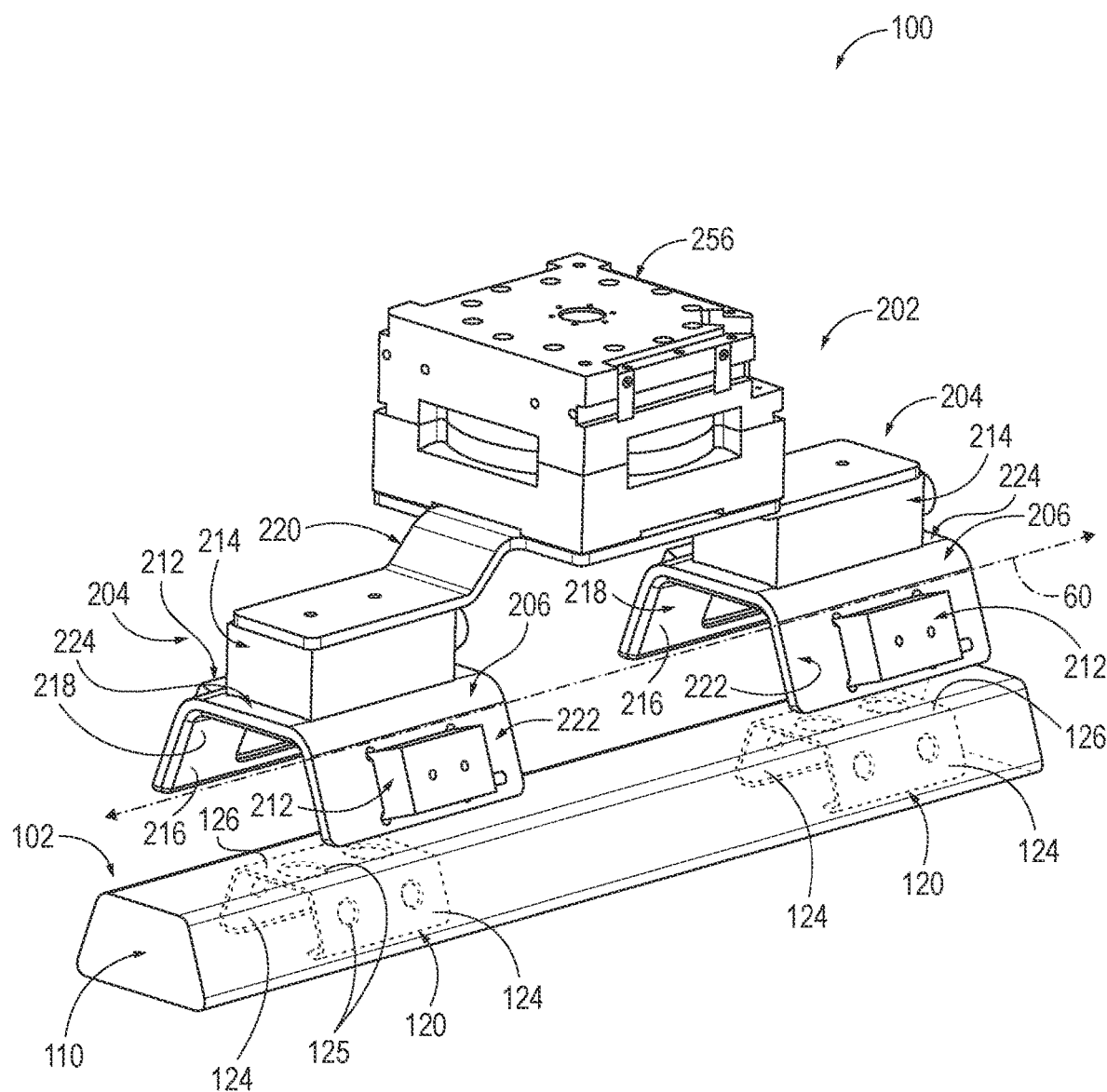
FIG. 8 is a partially exploded view of the example of FIG. 7.

FIG. 7 is an isometric view illustrating an example of carriage 202 of magnetic carriage system 200 and a section of bladder 102. More specifically, FIG. 7 illustrates bladder 102 received within stringer interior volume 20 of hat stringer 10 and hat stringer 10 operably received within brackets 206 of magnetic heads 204. FIG. 8 is a partially exploded view of the example of FIG. 7, illustrating bladder 102 removed from stringer interior volume 20. Generally with reference to FIGS. 7-8, and with initial focus on FIG. 7, in this example, magnetic handling system 100 includes caul 160, and hat stringer 10 is received within the caul interior volume of caul 160, with caul wall interior surface 164 directly contacting and supporting stringer wall exterior surface 26 of hat stringer 10. Carriage 202 comprises a pair of magnetic heads 204 and chassis 220 that supports magnetic heads 204 relative to one another. More specifically, chassis 220 supports magnetic heads 204 such that the longitudinal axes thereof are coaxial, or aligned. In some examples, chassis 220 rigidly couples magnetic heads 204 to one another in this arrangement. Carriage 202 also includes a coupling structure 256 that is configured to operably couple carriage to a support structure and/or to a robotic arm, as discussed in more detail herein.

Each bracket 206 includes lateral bracket portions 222 and cap bracket portion 224 that extend parallel to sidewall portions 16 and cap wall portion 18 of hat stringer 10, respectively. Lateral bracket portions 222 and cap bracket portion 224 define bracket interior surface 216, and bracket interior surface 216 directly contacts and supports caul wall exterior surface 168 of caul 160. Hat stringer 10 and bladder 102 are operably received within bracket interior volume 218 with caul 160 interposing hat stringer 10 and bracket interior surface 216. Each magnetic head 204 includes lateral magnetic sources 212, which are attached to lateral bracket portions 222, and cap magnetic source 214, which is attached to cap bracket portion 224.

In the example of FIGS. 7-8, bladder 102 includes bladder body 110 and/or is of a solid construction. For purposes of illustration, bladder body 110 is shown transparently in FIG. 8. As shown in FIG. 8, each magnetic insert 120 includes lateral magnetic walls 124 and cap magnetic wall 126. Lateral magnetic walls 124 and cap magnetic wall 126 are integral with one another, and magnetic insert 120 includes bores 125, which are filled with bladder body 110 to assist in structural integration of magnetic insert 120 and bladder body 110. Lateral magnetic walls 124 are oriented to extend at least approximately parallel to lateral bracket portions 222 and/or sidewall portions 16, and cap magnetic wall 126 is oriented to extend at least approximately parallel to cap bracket portion 224 and/or cap wall portion 18.

In FIG. 7, magnetic heads 204 are magnetically engaged with magnetic inserts 120. Specifically, cap magnetic sources 214 are magnetically coupled with cap magnetic walls 126, and lateral magnetic sources 212 are magnetically coupled with lateral magnetic walls 124. Consequently, bladder 102 urges hat stringer 10 against caul 160 and caul 160 against bracket interior surface 216 such that hat stringer 10 and caul are retained between bladder 102 and brackets 206.

Figure 9:
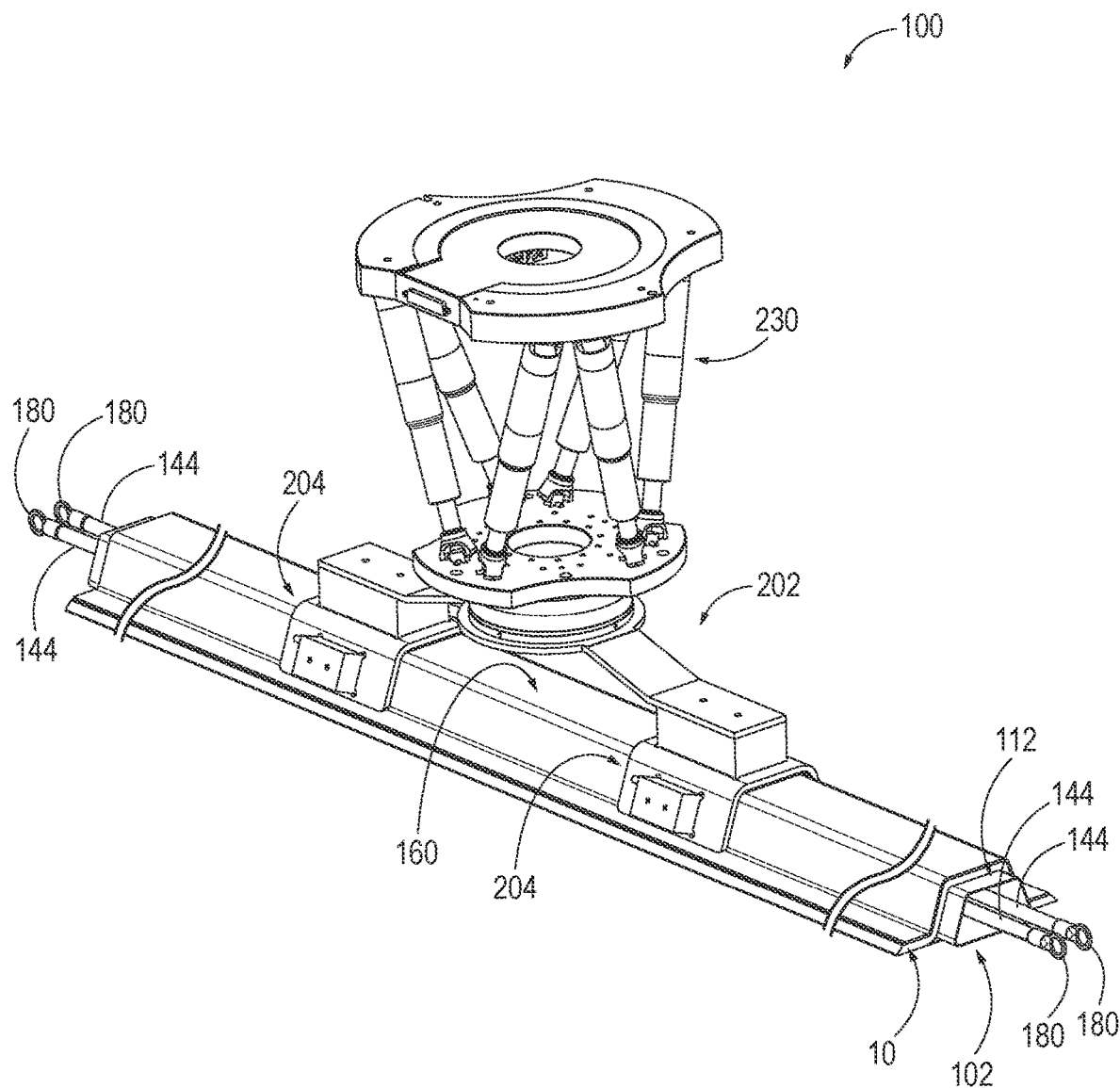
FIG. 9 is an isometric view illustrating another example magnetic handling system with a carriage and a section of a bladder thereof magnetically engaged with one another according to the present disclosure.
Figure 10:
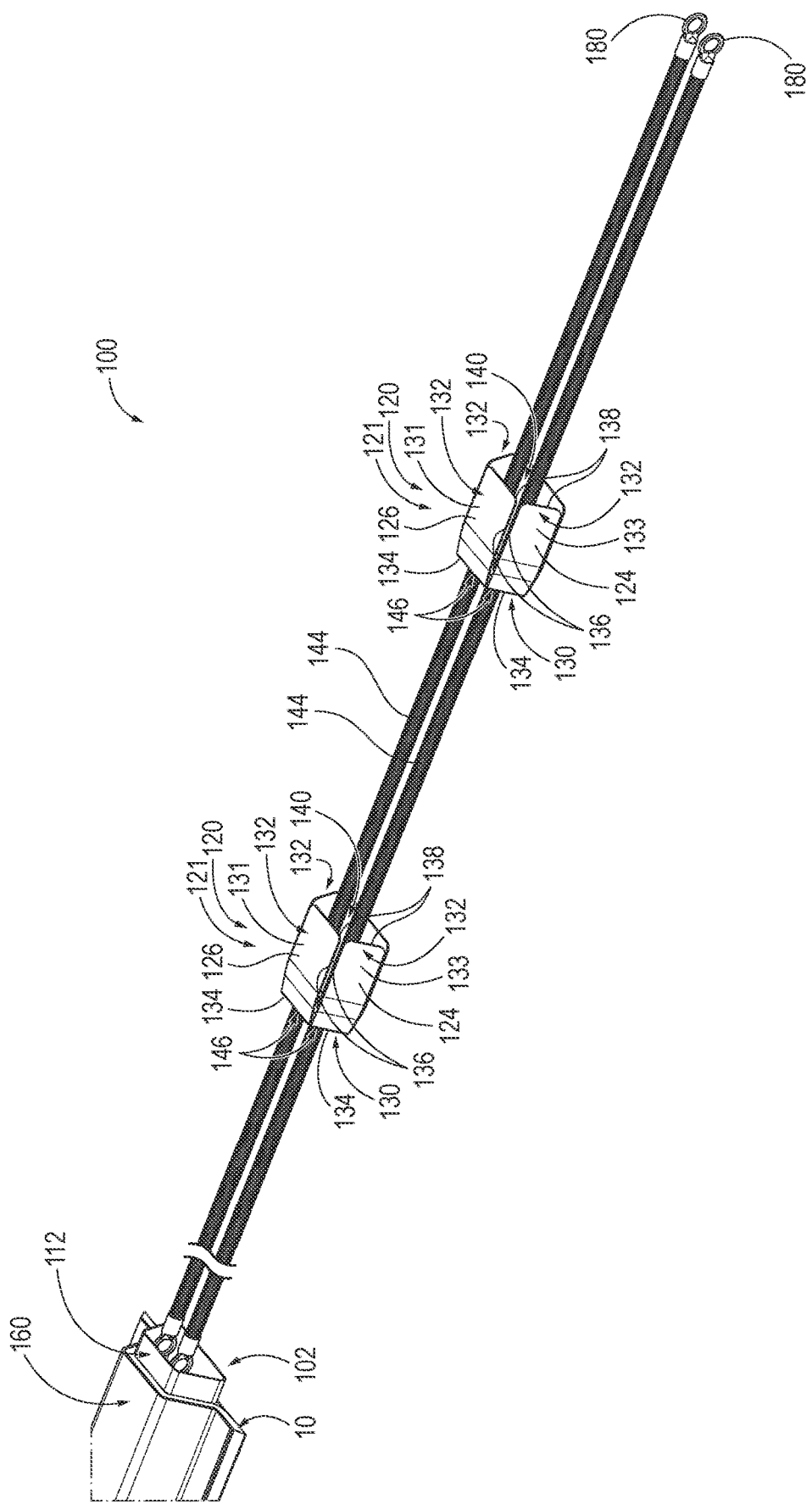
FIG. 10 is a partially exploded view of the examples of FIG. 9.

FIGS. 9-10 are isometric views illustrating examples in which bladder 102 comprises bladder sleeve 112. More specifically, FIG. 9 illustrates a section of bladder 102, hat stringer 10, and caul 160 with hat stringer 10 and caul 160 operably retained between bladder 102 and magnetic heads 204, as discussed herein. FIG. 10 is a partial view of the examples of FIG. 9 showing magnetic inserts 120 removed from bladder sleeve 112. As perhaps best seen in FIG. 10, each magnetic insert 120 is a flared magnetic insert 121, comprising nose wall 130 and flaps 132 cantilevered from nose wall 130. Flaps 132 include cap flap 131, which includes cap magnetic wall 126 and lateral flaps 133, which extend transverse to cap flap 131 and include lateral magnetic walls 124, as discussed herein. Each flap 132 includes a leading edge 134 along which flap 132 is operably attached to nose wall 130. Flaps 132 collectively define insert interior space 140, and the leading portion of each flap 132 is angled outwardly from nose wall 130 such that the cross-sectional area of insert interior space 140 is greater to the rear of the leading portion of flaps 132.

Flaps 132 are deflectably cantilevered from nose wall 130. More specifically, flaps 132 include longitudinal edges 136 along which each flap 132 is disconnected from the flaps 132 adjacent thereto. Each flap 132 also includes a trailing edge 138 that is disconnected from the other flaps 132. Flaps 132 may be connected to nose wall 130 in any suitable manner such that flaps 132 may be biased to the nominal orientation shown in FIG. 10 and resiliently deflect therefrom. For example, flaps 132 and nose wall 130 may be formed of a resilient metal such as steel, and flaps 132 may be integrally formed with nose wall 130. Additionally or alternatively, each flap 132 may be coupled to nose wall by a spring-biased hinge that biases flap 132 to the orientation shown in FIG. 10 and permits flap 132 to pivot towards insert interior space 140.

Bladder 102 further includes a pair of handling cables 144 that extend through and interconnect flared magnetic inserts 121. Each flared magnetic insert 121 includes cable receivers 146 that are configured to couple flared magnetic insert 121 to handling cables 144 and selectively retain flared magnetic insert 121 at a fixed location along handling cables 144. The ends of handling cables 144 project from the ends of bladder sleeve 112 when handling cables 144 and flared magnetic inserts 121 are received in bladder sleeve 112. The ends of handling cables 144 are provided with couplers 180 that may be utilized to lift bladder 102 and hat stringer 10.

In some examples, handling cables 144 are utilized to install flared magnetic inserts 121 within bladder sleeve 112. More specifically, to install flared magnetic inserts 121 within bladder sleeve 112, a parachute may be attached to the leading couplers 180 of handling cables 144, and forced air may be utilize to draw the parachute along with leading couplers 180 through bladder sleeve 112. This causes handling cables 144 and the plurality of flared magnetic inserts 121 to be pulled into bladder sleeve 112 with flared magnetic inserts 121 being positioned appropriately within bladder sleeve 112 when leading couplers 180 exit the far end, or leading end, of bladder sleeve 112. With this in mind, the nose wall 130 of each flared magnetic insert 121 may be provided with vents that permit the forced air to flow through and out of insert interior space 140 during installation of flared magnetic inserts 121 within bladder sleeve 112. In some examples, handling cables 144 are configured to carry electrical current to flared magnetic inserts 121 such that electromagnets may be utilized in magnetic walls 122.

With reference to FIG. 9, illustrated therein is an example in which carriage 202 is coupled to robotic arm 230. In this particular example, robotic arm 230 includes a hexapod, which is configured position and orient carriage 202 with 6 degrees of freedom.

Figure 11:
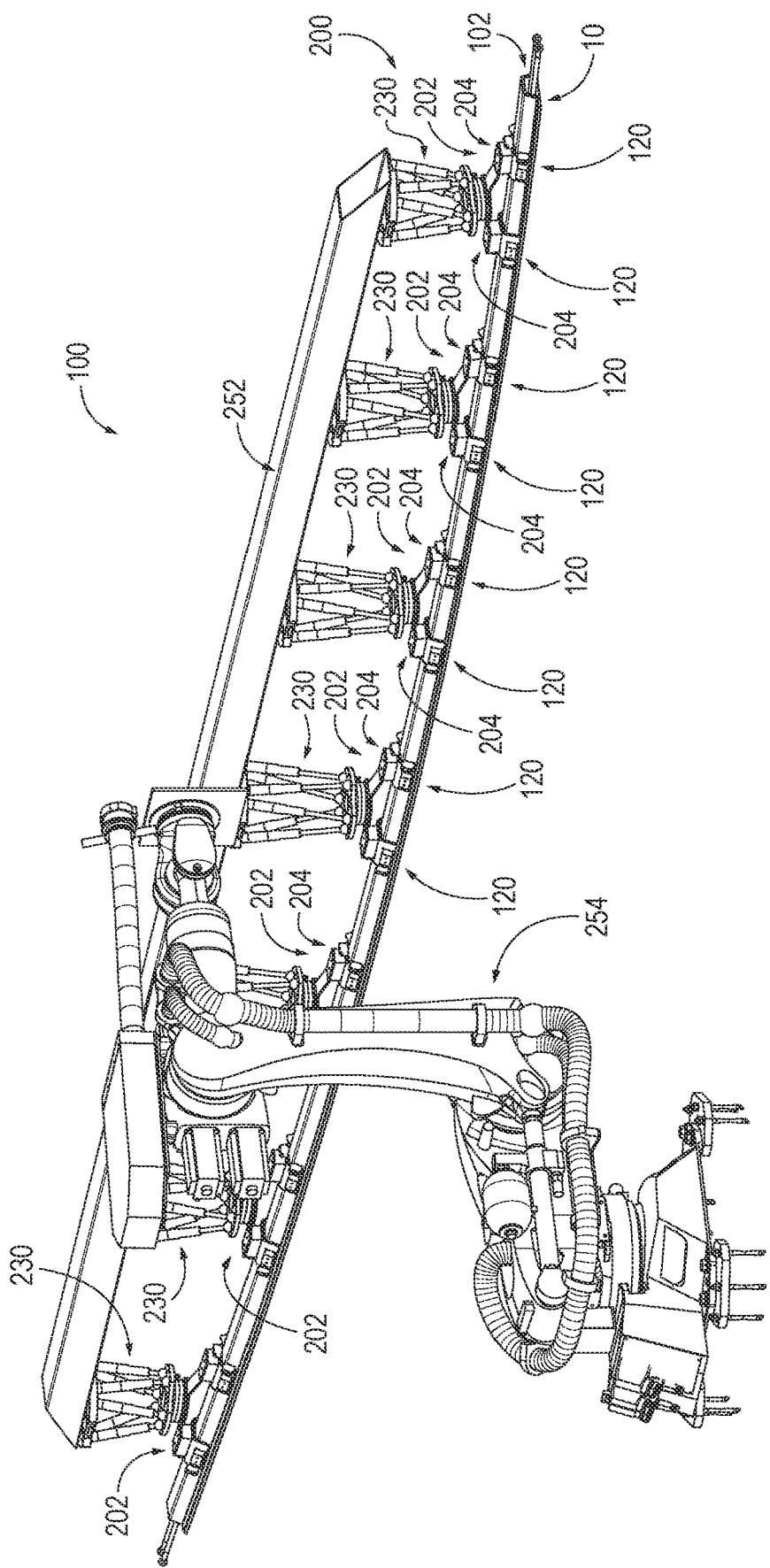
FIG. 11 is an isometric view illustrating an example magnetic handling system that includes a plurality of carriages supported by a plurality of robotic arms according to the present disclosure.

FIG. 11 illustrates examples of magnetic handling system 100 operably retaining hat stringer 10 in a desired stringer longitudinal conformation. More specifically, magnetic carriage system 200 comprises a plurality of carriages 202, specifically seven carriages 202, and a corresponding plurality of robotic arms 230 coupled to carriages 202. Each robotic arm 230 is mounted on guide frame 252, and the position of each robotic arm 230 along guide frame 252 may be adjusted such as to permit magnetic handling system 100 to be utilized with hat stringers 10 of various hat stringer length. Magnetic handling system 100 further includes robotic positioning assembly 254 that is coupled to and supports guide frame 252 spaced above a ground or support surface. Robotic positioning assembly 254 is configured to be actuated to control the position and orientation of guide frame 252, for example, within 6 degrees of freedom.

Each carriage 202 includes a pair of magnetic heads 204. Bladder 102 is received within hat stringer 10, and magnetic inserts 120 thereof are aligned with magnetic heads 204. Each magnetic head 204 is magnetically engaged with a respective magnetic insert 120 such that hat stringer 10 is operably retained between magnetic heads 204 and bladder 102. Each robotic arm 230 is configured to control the relative position and orientation of the respective carriage 202 such that robotic arms 230 collectively are configured to manipulate hat stringer 10 into the desired stringer longitudinal conformation via magnetic heads 204. Once magnetic heads 204 are positioned and oriented to conform hat stringer 10 in the desired stringer longitudinal conformation, robotic positioning assembly 254 may be utilized to move hat stringer 10, as retained in the desired stringer longitudinal conformation by magnetic handling system 100, onto the appropriate position along an aircraft skin.

Figure 12:
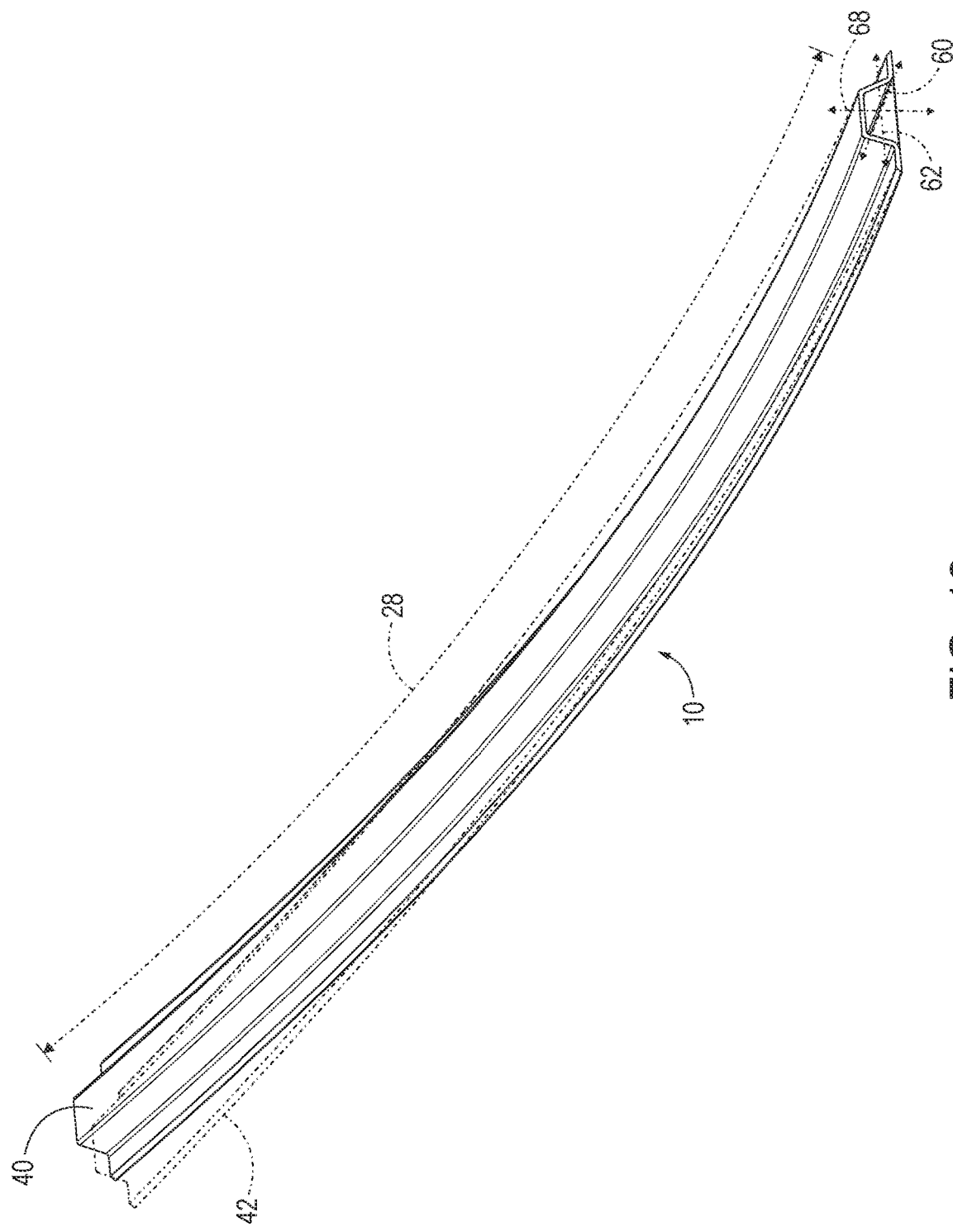
FIG. 12 is an isometric view illustrating an example hat stringer in an initial conformation and in a desired stringer longitudinal conformation.

FIG. 12 is an isometric view illustrating hat stringer 10 in an initial conformation 40 (solid lines) and in desired stringer longitudinal conformation 42 (dot-dash lines) as manipulated by magnetic handling systems 100 according to the present disclosure. As shown, cross-sections of hat stringer 10 normal to stringer length 28 are at least substantially uniform in shape and dimension along stringer length 28. In this example, hat stringer 10 is a partially cured composite stringer. Hat stringer 10 comprises loft, or contour, in initial conformation 40, which may be imparted on hat stringer 10 by a preceding manufacturing process (e.g., stamp forming). As discussed, loft means that cross-sections of hat stringer 10 are offset from one another along azimuthal axis 68. That said, in this example, the loft profile in desired stringer longitudinal conformation 42 is different from the loft profile in initial conformation 40. Desired stringer longitudinal conformation 41 also is twisted and skewed relative to initial conformation 40. Specifically, as discussed, skew means that the cross-sections of hat stringer 10 are offset from one another along lateral axis 62 and twist means that cross-sections of hat stringer 10 are rotated relative to one another about longitudinal axis 60. Accordingly, in the example of FIG. 12, magnetic handing system 100 has applied loft, twist, and skew to hat stringer 10 to manipulate hat stringer 10 from initial conformation 40 to desired stringer longitudinal conformation 42.

Figure 13:
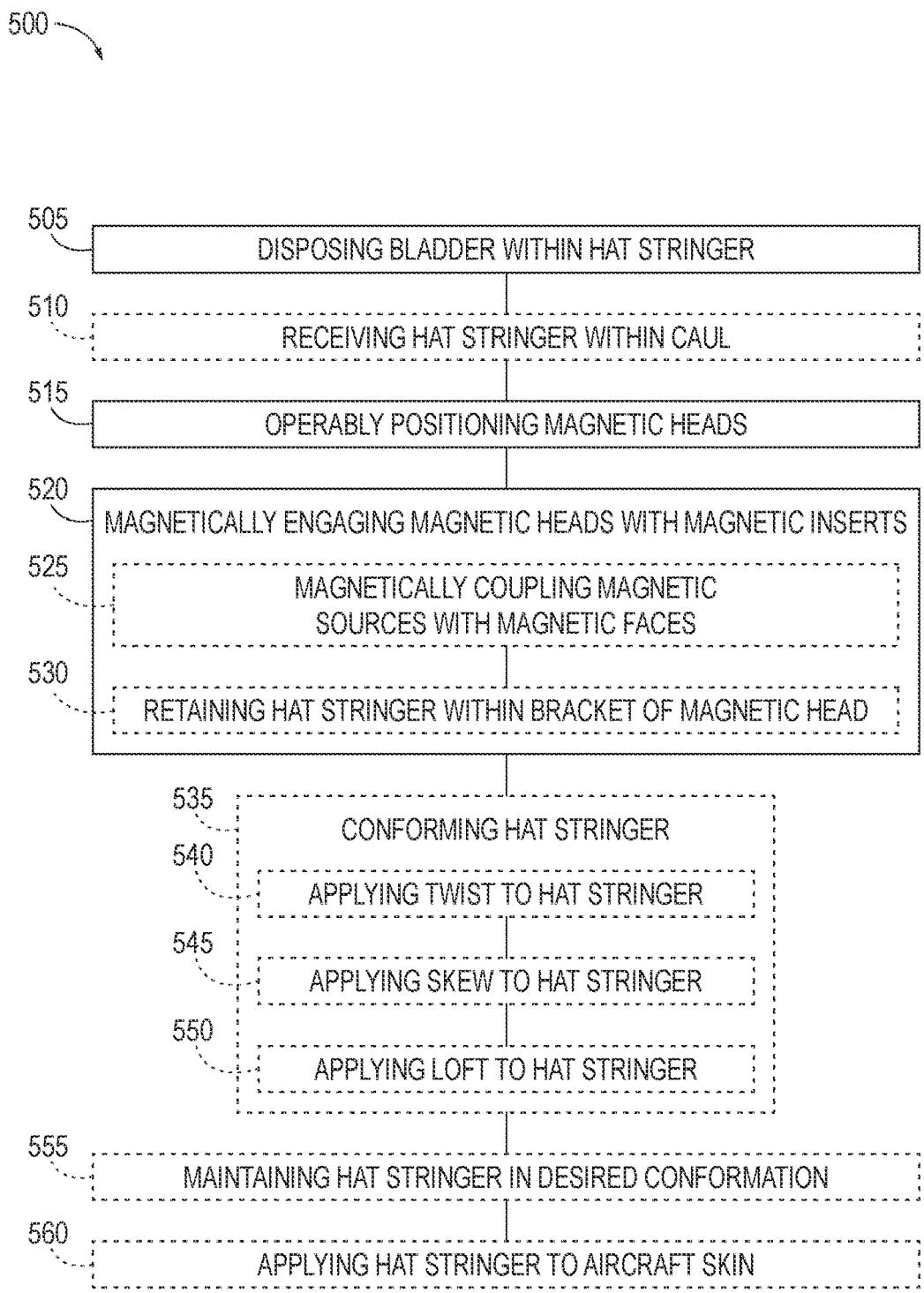
FIG. 13 is a flowchart schematically representing examples of methods according to the present disclosure.

FIG. 13 schematically provides a flowchart that represents illustrative, non-exclusive examples of methods 500 according to the present disclosure. In FIG. 13, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 13 are not limiting and other methods and steps are within the scope of the present disclosure, including methods having greater than or fewer than the number of steps illustrated, as understood from the discussions herein.

Methods 500 include methods of handling a hat stringer utilizing a magnetic handling system. Each step or portion of methods 500 may be performed utilizing magnetic handling systems 100 that are illustrated and discussed herein in connection to FIGS. 3-12 and/or to handle hat stringers 10 that are illustrated and discussed herein in connection to FIGS. 1-12. Likewise, any of the features, functions, structures, portions, etc. of magnetic handling systems 100 that are illustrated and discussed herein with reference to methods 500 and FIG. 13 may be included in and/or utilized with the examples of FIGS. 3-12 without departing from the scope of the present disclosure.

As shown in FIG. 13, methods 500 comprise disposing 505 a bladder within a hat stringer, operably positioning 515 magnetic heads, and magnetically engaging 520 magnetic heads with magnetic inserts, which may comprise magnetically coupling 525 magnetic sources with magnetic walls, and retaining 530 the hat stringer within a bracket of each magnetic head. Methods 500 may include receiving 510 the hat stringer within a caul, conforming 535 the hat stringer, maintaining 555 the hat stringer in a desired conformation, and applying 560 hat stringer to an aircraft skin. The conforming 535 may include applying twist 540 to the hat stringer, applying skew 545 to the hat stinger, and/or applying loft 550 to the hat stringer.

The disposing 505 comprises disposing the bladder within a stringer interior volume of the hat stringer. The disposing 505 also comprises supporting a stringer wall interior surface that defines the stringer interior volume against a bladder exterior surface of the bladder. The disposing 505 may include positioning, translating, moving, inserting, and/or drawing the bladder 102 into the stringer interior volume 20 in any suitable manner. As mentioned, bladder 102 comprises a plurality of magnetic inserts 120 distributed along a bladder length 104 and interior of the bladder exterior surface 106. Accordingly, the disposing 505 comprises positioning the plurality of magnetic inserts 120 within stringer interior volume 20, such as spaced apart from one another along stringer length 28 of hat stringer 10. In some examples, hat stringer 10 is an uncured, or partially cured, hat stringer 10, as discussed herein.

In some examples, methods 500 comprise receiving 510 the hat stringer 10 within a caul interior volume 166 of the caul 160, such that a caul wall interior surface 164 of caul 160 contacts and supports a stringer wall exterior surface 26 of hat stringer 10, as discussed herein. Thus, for examples in which methods 500 comprise the receiving 510, wall 12 of hat stringer 10 is supported between bladder 102 and caul 160 subsequent to the disposing 505 and the receiving 510.

Methods 500 comprise operably positioning 515 a plurality of magnetic heads relative to the hat stringer such that each magnetic head is aligned with a corresponding magnetic insert of bladder. In some examples, the operably positioning 515 is performed subsequent to the disposing 505 and optionally subsequent to the receiving 510. In some examples, the operably positioning 515 comprises aligning, and/or at least substantially magnetically aligning, the magnetic sources 208 of each magnetic head 204 with corresponding magnetic walls 122 of the respective magnetic insert 120, as discussed herein. In some examples, the operably positioning 515 comprises operably receiving the hat stringer 10 within brackets 206 of magnetic heads 204, as discussed herein. In some examples, the operably positioning 515 comprises translating and/or orienting the carriages 202 that support magnetic heads 204, such as utilizing robotic arms 230 and optionally robotic positioning assembly 254, as discussed herein.

Methods 500 further comprise magnetically engaging 520 each magnetic head with the corresponding magnetic insert 120 while the bladder is received within stringer interior volume 20. Accordingly, the magnetically engaging 520 is performed subsequent to the disposing 505, and may be performed subsequent to and/or at least substantially simultaneously with the operably positioning 515, and/or subsequent to the receiving 510.

In some examples, the magnetically engaging 520 comprises, respective to each magnetic head and the corresponding magnetic insert, magnetically coupling 525 the magnetic sources with the respective magnetic walls of the magnetic insert. More specifically, the magnetically coupling 525 comprises producing a plurality of attractive magnetic forces 50 between the magnetic head 504 and the magnetic walls 122, where at least two of the attractive magnetic forces 50 are oriented along at least partially opposing directions, as discussed herein. In some examples, the magnetically coupling 525 comprises producing a first attractive magnetic force 50 along a first direction 52 between a first lateral magnetic source 212 and a first lateral magnetic wall 124 and producing a second attractive magnetic force 50 along a second direction 54 between a second lateral magnetic source 212 and a second lateral magnetic wall 124, where the first direction 52 is at least partially opposed to the second direction 54. In some examples, the magnetically coupling 525 further comprises producing a third attractive magnetic force 50 along a third direction 56 between a cap magnetic source 214 and a cap magnetic wall 126, where the third direction 56 is at least partially normal to the first direction 52 and the second direction 54.

For some examples in which the magnetic sources 208 and/or the magnetic walls 122 comprise permanent magnets, the operably coupling 525 is performed during and/or as a result of the operably positioning. Namely, in some such examples, aligning the magnetic walls 122 with the magnetic sources 208 and operably receiving bladder 102 within bracket 206 of magnetic head 204 produces the plurality of attractive magnetic forces 50, as discussed herein. Additionally or alternatively, in some examples, the magnetically coupling 525 comprises actuating or activating the magnetic sources to produce respective magnetic fields. As a more specific example, the activating the magnetic sources includes providing electrical current to magnetic sources 208 for examples in which magnetic sources 208 comprise or are electromagnets.

The magnetically engaging 520 further comprises, respective to each magnetic head and the corresponding magnetic insert, retaining 530 the hat stringer within the bracket of the magnetic head utilizing the plurality of attractive magnetic forces 50. Accordingly, the retaining 530 is performed at least substantially simultaneously with and/or as a result of the magnetically coupling 525. More specifically, the retaining 530 comprises urging the bladder exterior surface 106 of bladder 102 against stringer wall interior surface 24. For some examples in which methods 500 comprise the receiving 510, the retaining 530 comprises retaining and/or supporting the wall 12 of the hat stringer 10 and a caul wall 162 of the caul 160 between the bladder 102 and the bracket 206 of the magnetic head 204. More specifically, in some such examples, the retaining 530 comprises urging the stringer wall exterior surface 26 of hat stringer 10 against caul wall interior surface 164 of the caul 160, and urging a caul wall exterior surface 168 of the caul 160 against a bracket interior surface 216 of the bracket 206 of the magnetic head 204, as discussed herein.

With continued reference to FIG. 13, in some examples, methods 500 comprise conforming 535 the hat stringer into a desired stringer longitudinal conformation. When methods 500 comprise the conforming 535, the conforming is performed subsequent to the magnetically engaging 520 such that each magnetic head 204 is magnetically engaged with the corresponding magnetic insert 120 during the conforming 535. In other words, methods 500 comprise maintaining magnetic engagement between the magnetic heads 204 and the respective magnetic inserts 120 during the conforming 535. In some examples, the conforming comprises orienting and/or positioning one or more magnetic heads 204 relative to one or more other magnetic heads 204, for example, utilizing robotic arms 230, as discussed herein. In some examples, the conforming 535 comprises balancing restoring forces and/or restoring torques from the hat stringer 10 utilizing attractive magnetic forces 50, as discussed herein.

In some examples, the conforming 535 comprises applying twist to the hat stringer. In some examples, the applying twist 540 comprises rotating at least one magnetic head 204 about its longitudinal axis 60 relative to at least one other magnetic head 204. In some examples, the applying twist 540 further comprises balancing an opposing twist torque from the hat stringer 10 with the plurality of attractive magnetic forces 50 between the at least one magnetic head 204 and the corresponding magnetic insert 120. In other words, in some examples, the applying twist 540 comprises retaining, with the attractive magnetic forces 50, the hat stringer 10 within the plurality of brackets 206 against the opposing twist torque from the hat stringer 10.

In some examples, the conforming 535 comprises applying skew 545 to the hat stringer. In some examples, the applying skew 545 comprises laterally translating, e.g., along lateral axis 62, at least one magnetic head 204 relative to at least one other magnetic head 204 to apply the skew to the hat stringer 10. In some examples, the applying skew 545 comprises balancing, with attractive magnetic forces 50, an opposing lateral force from the hat stringer 10 and/or retaining, with attractive magnetic forces 50, the hat stringer 10 within the plurality of brackets 206 against the opposing lateral force.

In some examples, the conforming 535 comprises applying loft 550 to the hat stringer. In some examples, the applying loft 550 comprises translating at least one magnetic head 204 along azimuthal axis 68 (e.g., vertically translating) relative to at least one other magnetic head 204 to apply loft to the hat stringer 10. In some examples, the applying loft 550 comprises balancing, with attractive magnetic forces 50, an opposing force from hat stringer 10 along azimuthal axis 68. In some examples, the conforming 535 comprises each of the applying twist 540, the applying skew 545, and the applying loft 550.

In some examples, the conforming 535 further comprises maintaining tension in the hat stringer 10 along the stringer length 28, such as simultaneously with the applying twist 440, the applying skew 545, and/or the applying loft 550. In some examples, the maintaining tension comprises relieving compression in the hat stringer 10 that otherwise would result from the applying twist 440, the applying skew 545, and/or the applying loft 550. In some examples, the maintaining tension in the hat stringer 10 along the stringer length 28 prevents wrinkling in the hat stringer 10. In some examples, the maintaining tension comprises avoiding compression in one or more regions of the wall 12 of the hat stringer 10.

With continued reference to FIG. 13, methods 500 may include maintaining 555 the hat stringer in the desired hat stringer longitudinal conformation and applying 560 the hat stringer to an aircraft skin in the desired stringer longitudinal conformation. When comprised in methods 500, the maintaining 555 and the applying 560 are performed subsequent the conforming 535 and/or while the plurality of magnetic heads 204, together with bladder 102, retain the hat stringer 10 in the desired stringer longitudinal conformation 42. The applying 560 includes applying the hat stringer 10 to a preselected region of the aircraft skin 30. In some examples, the applying 560 comprises positioning the hat stringer 10 relative to the preselected region of the aircraft skin 30, which may be performed utilizing the robotic positioning assembly 254. In some examples, the applying 560 comprises engaging flanges 22 of hat stringer 10 with the preselected region of aircraft skin 30, such as by pressing flanges 22 against aircraft skin. In some examples, the preselected region of aircraft skin comprises a conformation that matches the conformation of flanges 22 as a result of the conforming 535. In other words, flanges 22 are shaped by the conforming 535 to extend parallel to the preselected region of aircraft skin 30 such that at least 95%, at least 98%, at least 99%, and/or at least 99.9% of an area of stringer wall interior surface 24 along flanges 22 is conformed to contact the preselected region of aircraft skin 30 upon the applying 560. As more specific examples, the aircraft skin 30 may be an upper skin or a lower skin of an aircraft wing box 74, as discussed herein.

As mentioned, in some examples, the hat stringer 10 is uncured and/or partially cured. In some examples, methods 500 comprise curing the hat stringer on the aircraft skin subsequent to the applying 560. In some examples, the aircraft skin 30 also is uncured and/or partially cured, and methods 500 include co-curing the aircraft skin 30 and the hat stringer 10 with one another. In some examples, methods 500 comprise applying 560 a plurality of hat stringers to the aircraft skin and subsequently co-curing the plurality of hat stringers and the aircraft skin. In such examples, methods 500 include repeating any suitable combination of steps of methods 500 to conform each hat stringer 10 into the desired stringer longitudinal conformation 42 and apply each hat stringer 10 to a preselected region of the aircraft skin 30 as will be understood from the discussion herein.

Methods 500 further may include magnetically disengaging each magnetic head 204 from the corresponding magnetic insert 120 subsequent to the applying 560. For examples in which methods 500 comprise applying a plurality of hat stringers 10 to aircraft skin 30, methods 500 may comprise magnetically disengaging the magnetic heads 204 from the bladder 102 received in a hat stringer 10 that has been applied to the aircraft skin 30 and subsequently magnetically engaging the magnetic heads 204 with the bladder 102 received in another hat stringer 10.

Illustrative, non-exclusive examples of inventive subject matter according to the present disclosure are described in the following enumerated paragraphs:

A. A magnetic handling system (100) for a hat stringer (10), which comprises a wall (12) having a plurality of wall portions (14) that define a stringer interior volume (20), the magnetic handling system (100) comprising:

a bladder (102) configured to be received within the stringer interior volume (20) of the hat stringer (10) and comprising a magnetic insert (120), wherein the magnetic insert (120) comprises a plurality of magnetic walls (122) each being positioned and oriented to extend at least substantially aligned with a respective wall portion (14) of the plurality of wall portions (14) of the hat stringer (10);

a magnetic carriage system (200) comprising a carriage (202) configured to be coupled to a support structure (250) and comprising a magnetic head (204), wherein the magnetic head (204) comprises a bracket (206) and a plurality of magnetic sources (208) supported by the bracket (206), wherein each magnetic source (208) is configured to magnetically couple with a respective magnetic wall (122) of the magnetic insert (120) to produce an attractive magnetic force (50) therebetween; and wherein the plurality of magnetic sources (208) and the plurality of magnetic walls (122) are configured to magnetically couple with one another to produce a plurality of attractive magnetic forces (50) therebetween that are oriented along a plurality of different directions.

A1. The magnetic handling system of paragraph A, wherein the magnetic head (204) and the bladder (102) are configured to receive the wall (12) of the hat stringer (10) therebetween with each magnetic source (208) of the magnetic head (204) and the respective magnetic wall (122) of the magnetic insert (120) positioned on either side of the respective wall portion (14) of the hat stringer (10), and wherein the plurality of magnetic sources (208) and the plurality of magnetic walls (122) collectively are configured magnetically couple with one another to urge the bladder (102) against the hat stringer (10) to retain the hat stringer (10) within the bracket (206) of the magnetic head (204).

A2. The magnetic handling system (100) of any of paragraphs A-A1, wherein the bladder (102) defines a bladder length (104), and wherein each magnetic wall (122) of the plurality of magnetic walls (122) extends at least approximately parallel to the bladder length (104).

A3. The magnetic handling system (100) of paragraph A2, wherein the bracket (206) of the magnetic head (204) defines a bracket length (210), wherein the bracket length (210) of the magnetic head (204) is at least approximately parallel to the bladder length (104) of the bladder (102) when the plurality of magnetic sources (208) of the magnetic head (204) are magnetically coupled with the plurality of magnetic walls (122) of the magnetic insert (120).

A4. The magnetic handling system (100) of any of paragraphs A-A3, wherein the plurality of wall portions (14) of the hat stringer (10) comprises a cap wall portion (18), a pair of sidewall portions (16) spaced apart from one another by the cap wall portion (18), and a pair of flanges (22), each extending from a respective sidewall portion (16) spaced apart from the cap wall portion (18) by the respective sidewall portion (16), and wherein the pair of sidewall portions (16) and the cap wall portion (18) define the stringer interior volume (20).

A5. The magnetic handling system (100) of any of paragraphs A-A4, wherein the plurality of magnetic walls (122) of the magnetic insert (120) includes a pair of lateral magnetic walls (124) that are respectively positioned and oriented to extend at least substantially aligned with a/the pair of sidewall portions (16) of the hat stringer (10).

A6. The magnetic handling system (100) of paragraph A5, wherein the pair of lateral magnetic walls (124) are oriented at a lateral face angle relative to one another wherein the lateral face angle is at least 0°, at least 5°, at least 8° at least 10°, at least 12°, at least 15°, at least 20°, at most 8°, at most 10°, at most 12°, at most 15°, at most 20°, and/or at most 30°.

A7. The magnetic handling system (100) of any of paragraphs A5-A6, wherein the plurality of magnetic sources (208) of the magnetic head (204) include a pair of lateral magnetic sources (212) that are respectively configured to magnetically couple with the pair of lateral magnetic walls (124) of the magnetic insert (120).

A8. The magnetic handling system of paragraph A7, wherein the attractive magnetic force (50) produced between each lateral magnetic wall (124) of the pair of lateral magnetic walls (124) and a respective lateral magnetic source (212) of the pair of lateral magnetic sources (212) is directed through, and optionally at least substantially normal to, a respective sidewall portion (16) of the pair of sidewall portions (16) of the hat stringer (10) when the hat stringer (10) is received between the bladder (102) and the magnetic head (204).

A9. The magnetic handling system (100) of any of paragraphs A7-A8, wherein a first lateral magnetic source (212) of the pair of lateral magnetic sources (212) is configured to magnetically couple with a first lateral magnetic wall (124) of the pair of lateral magnetic walls (124) to produce a first attractive magnetic force (50) of the plurality of attractive magnetic forces (50), wherein the first attractive magnetic force (50) is oriented along a first direction (52), wherein a second lateral magnetic source (212) of the pair of lateral magnetic sources (212) is configured to magnetically couple with a second lateral magnetic wall (124) of the pair of lateral magnetic walls (124) to produce therebetween a second attractive magnetic force (50) of the plurality of attractive magnetic forces (50), wherein the second attractive magnetic force (50) is oriented along a second direction (54), and wherein the first direction (52) is at least partially opposed to, and optionally at least substantially opposed to, the second direction (54).

A10. The magnetic handling system (100) of any of paragraphs A7-A9, wherein the bracket (206) includes a pair of lateral bracket portions (222) that are positioned and oriented to at least substantially align with the pair of lateral magnetic walls (124) of the magnetic insert (120) when the bladder (102) is operably received within the magnetic head (204), and wherein the pair of lateral magnetic sources (212) of the magnetic head (204) are mounted on the pair of lateral bracket portions (222).

A11. The magnetic handling system (100) of any of paragraphs A5-A10, wherein the plurality of magnetic walls (122) of the magnetic insert (120) further include a cap magnetic wall (126) that is positioned and oriented to extend at least substantially aligned with a/the cap wall portion (18) of the hat stringer (10), and wherein the plurality of magnetic sources (208) of the magnetic head (204) further includes a cap magnetic source (214) that is configured to magnetically couple with the cap magnetic wall (126) of the magnetic insert (120).

A12. The magnetic handling system (100) of paragraph A11, when depending from paragraph A9, and wherein the cap magnetic source (214) is configured to magnetically couple with the cap magnetic wall (126) of the magnetic insert (120) to produce therebetween a third attractive magnetic force (50) of the plurality of attractive magnetic forces (50), wherein the third attractive magnetic force (50) is oriented along a third direction (56) that is at least partially normal to each of the first direction (52) and the second direction (54).

A13. The magnetic handling system (100) of paragraph A12, wherein each lateral magnetic wall (124) of the pair of lateral magnetic walls (124) is oriented at a cap-to-lateral face angle (128) relative to the cap magnetic wall (126), and wherein the cap-to-lateral face angle (128) is at least 90°, at least 100°, at least 110°, at least 120°, at least 130°, at least 140°, at most 100°, at most 110°, at most 120°, at most 130°, at most 140°, and/or at most 160°.

A14. The magnetic handling system (100) of any of paragraphs A-A13, wherein the magnetic insert (120) and the magnetic head (204) are configured to magnetically engage one another to retain the hat stringer (10) within the bracket (206) against vertical, torsional, and skew forces applied to the hat stringer (10), and wherein the magnetic head (204) and the magnetic insert (120) are magnetically engaged with one another when each magnetic source (208) of the magnetic head (204) is magnetically coupled with the respective magnetic wall (122) of the magnetic insert (120).

A15. The magnetic handling system (100) of any of paragraphs A-A14, wherein the wall (12) of the hat stringer (10) comprises a stringer wall interior surface (24) that defines the stringer interior volume (20), wherein the bladder (102) comprises a bladder exterior surface (106) that is shaped and dimensioned correspondingly to the stringer wall interior surface (24) optionally such that the bladder exterior surface (106) supports the stringer wall interior surface (24) when the bladder (102) is received within the stringer interior volume (20) of the hat stringer (10).

A16. The magnetic handling system (100) of paragraph A15, wherein the magnetic insert (120) is positioned within the bladder (102) such that the bladder exterior surface (106) interposes the magnetic insert (120) and the stringer wall interior surface (24) when the bladder (102) is received within the stringer interior volume (20) of the hat stringer (10), wherein the bladder exterior surface (106) defines a plurality of bladder exterior surface portions (108) corresponding to the plurality of wall portions (14) of the hat stringer (10), and wherein each magnetic wall (122) of the plurality of magnetic walls (122) of the magnetic insert (120) is at least substantially aligned with a respective bladder exterior surface portion (108).

A17. The magnetic handling system (100) of any of paragraphs A-A16, further comprising a caul (160) having a caul wall (162) that comprises a caul wall interior surface (164), wherein the caul wall interior surface (164) defines a caul interior volume (166), wherein the caul wall interior surface (164) is shaped correspondingly to a desired shape of a stringer wall exterior surface (26) of the hat stringer (10), and wherein the caul (160) is configured to receive the hat stringer (10) within the caul interior volume (166) with the stringer wall exterior surface (26) of the hat stringer (10) supported against the caul wall interior surface (164).

A18. The magnetic handling system (100) of paragraph A17, wherein the magnetic head (204) and the bladder (102) are configured to receive the caul wall (162) of the caul (160) and the wall (12) of the hat stringer (10) therebetween with the hat stringer (10) received within the caul interior volume (166), and wherein the plurality of magnetic sources (208) of the magnetic head (204) and the plurality of magnetic walls (122) of the magnetic insert (120) collectively are configured to urge the bladder (102) against the hat stringer (10) to retain the hat stringer (10) within the caul interior volume (166) and to retain the caul (160) within the bracket (206) of the magnetic head (204).

A19. The magnetic handling system (100) of any of paragraphs A17-A18, wherein the bracket (206) of the magnetic head (204) comprises a bracket interior surface (216) that defines a bracket interior volume (218), wherein the bracket interior surface (216) is dimensioned and shaped corresponding to a caul wall exterior surface (168) of the caul (160), and wherein the bracket (206) is configured to receive the caul (160) within the bracket interior volume (218) with the caul wall exterior surface (168) supported against the bracket interior surface (216).

A20. The magnetic handling system (100) of any of paragraphs A-A19, wherein the bladder (102) comprises a bladder body (110) having a solid construction, and wherein the magnetic insert (120) is engulfed by and suspended within the bladder body (110).

A21. The magnetic handling system (100) of any of paragraphs A-A19, wherein bladder (102) comprises a bladder sleeve (112) configured to encompass a hollow interior volume, wherein the magnetic insert (120) is configured to be selectively received within, and optionally selectively removed from within, the bladder sleeve (112), and wherein the bladder sleeve (112) comprises a/the bladder exterior surface (106).

A22. The magnetic handling system (100) of any of paragraphs A-A21, wherein the magnetic insert (120) is a flared magnetic insert (121), wherein the flared magnetic insert (121) includes a nose wall (130) and a plurality of flaps (132) that are cantilevered from the nose wall (130), wherein the nose wall (130) defines a leading end of the flared magnetic insert (121) and each flap (132) of the plurality of flaps (132) includes a leading edge (134) along which the flap (132) is cantilevered from the nose wall (130), and wherein the plurality of flaps (132) collectively comprise the plurality of magnetic walls (122).

A23. The magnetic handling system (100) of paragraph A22, wherein each flap (132) of the plurality of flaps (132) extends along an insert length (142) of the flared magnetic insert (121), wherein the plurality of flaps (132) collectively define an insert interior space (140) of the flared magnetic insert (121), and wherein a leading portion each flap (132) is angled outwardly from the nose wall (130) such that a cross-sectional area of the insert interior space (140) is greater away from the nose wall (130).

A24. The magnetic handling system of any of paragraphs A22-A23, wherein each flap (132) of the plurality of flaps (132) is deflectably cantilevered from the nose wall (130).

A25. The magnetic handling system (100) of any of paragraphs A22-A24, when depending from paragraph A21, wherein the plurality of flaps (132) of the flared magnetic insert (121) are configured to support the bladder sleeve (112) in a desired bladder conformation, at least along the flared magnetic insert (121).

A26. The magnetic handling system (100) of any of paragraphs A22-25, further comprising a handling cable (144) configured to extend through an interior of the bladder sleeve (112), wherein the nose wall (130) of the flared magnetic insert (121) comprises a cable receiver (146) configured to receive the handling cable (144).

A27. The magnetic handling system (100) of paragraph A26, further comprising a plurality of the flared magnetic inserts (121), each being mounted on the handling cable (144) via the respective cable receiver (146) and distributed along a length of the handling cable (144), wherein the handling cable (144), together with the plurality of flared magnetic inserts (121), are received within the interior of the bladder sleeve (112) with the plurality of flared magnetic inserts (121) supporting the bladder sleeve (112) in a/the desired bladder conformation.

A28. The magnetic handling system (100) of any of paragraphs A-A27, wherein the bladder (102) comprises a plurality of the magnetic inserts (120) that are spaced apart from one another along a/the bladder length (104) of the bladder (102), and wherein the plurality of magnetic inserts (120) are configured to magnetically engage with a respective plurality of magnetic heads (204) to conform the hat stringer (10) in a desired stringer longitudinal conformation (42).

A29. The magnetic handling system (100) of paragraph A28, wherein the magnetic carriage system (200) includes a plurality of the carriages (202) that collectively include the plurality of magnetic heads (204), wherein each magnetic head (204) of the plurality of magnetic heads (204) is configured to magnetically engage a respective magnetic insert (120) of the plurality of magnetic inserts (120).

A30. The magnetic handling system (100) of paragraph A29, wherein each carriage (202) of the plurality of carriages (202) includes two respective magnetic heads (204) of the plurality of magnetic heads (204), and wherein the two respective magnetic heads (204) are supported within the carriage (202) spaced apart from one another.

A31. The magnetic handling system (100) of any of paragraphs A28-A30, wherein the magnetic carriage system (200) is configured to control a position and an orientation of each carriage (202) of the plurality of carriages (202), and wherein the magnetic carriage system (200) is configured to independently control positions and the orientations of the plurality carriages (202) relative to one another.

A32. The magnetic handling system (100) of paragraph A31, wherein the magnetic handling system (100) further includes a plurality of robotic arms (230) that operatively connect the plurality of carriages (202) to the support structure (250), and wherein each robotic arm (230) is configured to control a position and an orientation of a respective carriage (202) of the plurality of carriages (202).

A33. The magnetic handling system (100) of paragraph A32, wherein when the bladder (102) is received in the stringer interior volume (20) and each magnetic insert (120) of the plurality of magnetic inserts (120) are magnetically engaged with the respective magnetic head (204) of the plurality of magnetic heads (204), the magnetic carriage system (200) is configured to control the plurality of robotic arms (230) to manipulate the hat stringer (10) into a/the desired stringer longitudinal conformation (42).

A34. The magnetic handling system (100) of paragraph A33, wherein at least one robotic arm (230) of the plurality of robotic arms (230) is configured to rotate the magnetic head (204) of the respective carriage (202) about its longitudinal axis (60) to apply twist to the hat stringer (10).

A35. The magnetic handling system (100) of any of paragraphs A33-A34, wherein at least one robotic arm (230) of the plurality of robotic arms (230) is configured to laterally translate the respective carriage (202) relative to at least one other carriage (202) of the plurality of carriages (202) to apply skew to the hat stringer.

A36. The magnetic handling system (100) of any of paragraphs A33-A35, wherein at least one robotic arm (230) of the plurality of robotic arms (230) is configured to translate the respective carriage (202) along an azimuthal axis (68) relative to at least one other carriage (202) of the plurality of carriages (202) to apply loft to the hat stringer (10).

A37. The magnetic handling system (100) of any of paragraphs A33-A36, wherein the magnetic handling system (100) is configured to maintain tension in the hat stringer (10) along a/the stringer length (28) of the hat stringer (10) while applying one or more of loft, skew, and twist to the hat stringer (10).

A38. The magnetic handling system of any of paragraphs A33-A37, wherein the magnetic handling system (100) is configured to maintain tension in the hat stringer (10) to avoid compression of one or more regions of a/the wall (12) of the hat stringer (10).

A39. The magnetic handling system (100) of any of paragraphs A37-A38, wherein adjacent robotic arms (230) of the plurality of robotic arms (230) are configured to translate the respective carriages (202) away from one another along a/the longitudinal axes (60) of the respective magnetic heads (204) to apply tension to the hat stringer 10 along the stringer length (28).

A40. The magnetic handling system (100) of any of paragraphs A-A39, wherein the hat stringer (10) is formed of partially cured composite material.

A41. The magnetic handling system (100) of any of paragraphs A-A40, further comprising a controller (90), comprising:
  a processing unit;
  a memory; and
  computer-readable media stored on the memory that, when executed by the processing unit, cause the controller (90) to operate the magnetic handling system (100) to perform at least a portion of the methods of any of paragraphs B-B16.

B. A method (500) of handling a hat stringer (10) utilizing a magnetic handling system (100), the method (500) comprising:
  disposing (505) a bladder (102) within a stringer interior volume (20) of the hat stringer (10), wherein the bladder (102) includes a plurality of magnetic inserts (120) distributed along a bladder length (104) of the bladder (102);
  operably positioning (515) a plurality of magnetic heads (204) relative to the hat stringer (10) such that each magnetic head (204) is aligned with a corresponding magnetic insert (120) of the plurality of magnetic inserts (120); and
  magnetically engaging (520) each magnetic head (204) with the corresponding magnetic insert (120) while the bladder (102) is received within the stringer interior volume (20).

B1. The method of paragraph B, wherein the magnetically engaging (520) includes, respective to each magnetic head (204) and the corresponding magnetic insert (120):
  magnetically coupling (525) a plurality of magnetic sources (208) comprised in the magnetic head (204) with a corresponding plurality of magnetic walls (122) comprised in the corresponding magnetic insert (120), wherein the magnetically coupling (525) comprises producing a plurality of attractive magnetic forces (50) between the magnetic head (204) and the plurality of magnetic walls (122), wherein the plurality of attractive magnetic forces (50) are respectively oriented in a plurality of different directions; and
  retaining (530) the hat stringer (10) within a bracket (206) of the magnetic head (204) utilizing the plurality of attractive magnetic forces (50).

B2. The method (500) of paragraph B1, wherein the disposing (505) comprises supporting a stringer wall interior surface (24) of the hat stringer (10) that defines the stringer interior volume (20) against a bladder exterior surface (106) of the bladder (102), wherein the plurality of magnetic inserts (120) are positioned within the bladder (102) interior of the bladder exterior surface (106), and wherein the retaining (530) comprises urging the bladder exterior surface (106) against the stringer wall interior surface (24).

B3. The method (500) of paragraph B2, further comprising receiving (510) the hat stringer (10) within a caul interior volume (166) of a caul (160) prior to the magnetically engaging (520), and wherein the retaining (530) comprises retaining a wall (12) of the hat stringer (10) and caul wall (162) of the caul (160) between the bladder (102) and the bracket (206) of the magnetic head (204).

B4. The method (500) of paragraph B3, wherein the urging further comprises urging a stringer wall exterior surface (26) of the hat stringer (10) against a caul wall interior surface (164) of the caul (160) and urging a caul wall exterior surface (168) of the caul (160) against a bracket interior surface (216) of the bracket (206) of the magnetic head (204).

B5. The method (500) of any of paragraphs B-B4, wherein the magnetically coupling (525) comprises producing a first attractive magnetic force (50) along a first direction (52) between a first lateral magnetic source (212) of the plurality of magnetic sources (208) and a first lateral magnetic wall (124) of the plurality of magnetic walls (122) and producing a second attractive magnetic force (50) along a second direction (54) between a second lateral magnetic source (212) of the plurality of magnetic sources (208) and a second lateral magnetic wall (124) of the plurality of magnetic walls (122), and wherein the first direction (52) is at least partially opposed to the second direction (54).

B6. The method (500) of paragraph B5, wherein the magnetically coupling (525) further comprises producing a third attractive magnetic force (50) along a third direction (56) between a cap magnetic source (214) of the plurality of magnetic sources (208) and a cap magnetic wall (126) of the plurality of magnetic walls (122), wherein the third direction (56) is at least partially normal to the first direction (52) and the second direction (54).

B7. The method (500) of any of paragraphs B-B6, further comprising conforming (535) the hat stringer (10) into a desired stringer longitudinal conformation (42), wherein the conforming (535) is performed subsequent to the magnetically engaging (520) and while each magnetic head (204) is magnetically engaged with the corresponding magnetic insert (120).

B7.1. The method (500) of paragraph B7, wherein the hat stringer (10) is operatively retained between the plurality of magnetic heads (204) and the bladder (102) during the conforming (535), and wherein the conforming (535) comprises moving at least one magnetic head (204) relative to at least one other magnetic head (204).

B8. The method (500) of any of paragraphs B7-B7.1, wherein the conforming (535) comprises applying twist (540) to the hat stringer (10), wherein the applying twist (540) comprises rotating a magnetic head (204) of the plurality of magnetic heads (204) about its longitudinal axis (60) relative to at least one other magnetic head (204) of the plurality of magnetic heads (204).

B9. The method (500) of paragraph B8, wherein the applying twist (540) further comprises balancing an opposing twist torque from the hat stringer (10) with the plurality of attractive magnetic forces (50) between the magnetic head (204) and the corresponding magnetic insert (120).

B10. The method (500) of any of paragraphs B7-B9, wherein the conforming (535) comprises applying skew (545) to the hat stringer (10), wherein the applying skew (545) comprises laterally translating at least one magnetic head (204) relative to at least one other magnetic head (204).

B11. The method (500) of any of paragraphs B7-1310, wherein the conforming (535) further comprises applying loft (550) to the hat stringer (10), wherein the applying loft (550) comprises vertically translating one or more magnetic heads (204) relative to one or more other magnetic heads (204).

B12. The method (500) of any of paragraphs B7-B11, wherein the conforming (535) further comprises maintaining tension in the hat stringer (10) along the hat stringer length (28) during one or more of a/the applying twist (540), a/the applying skew (545), and a/the applying loft (550).

B13. The method of paragraph B12, wherein the maintaining tension in the hat stringer (10) comprises avoiding compression of one or more regions of a/the wall (12) of the hat stringer (10).

B14. The method (500) of any of paragraphs B7-B13, further comprising:
  maintaining (555) the hat stringer (10) in the desired stringer longitudinal conformation (42) and applying (560) the hat stringer (10) to an aircraft skin (30) in the desired stringer longitudinal conformation (42).

B15. The method (500) of any of paragraphs B-B14, further comprising magnetically disengaging each magnetic head (204) from the corresponding magnetic insert (120).

B16. The method (500) of any of paragraphs B-B15, wherein the magnetic handling system (100) is the magnetic handling system (100) of any of paragraphs A-A40.

C. The use of the magnetic handling system (100) of any of paragraphs A-A40 to install a/the hat stringer (10) in an aircraft wing box (74).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase, "for example," the phrase, "as an example," the phrase "in some examples," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A magnetic handling system for a hat stringer which comprises a wall having a plurality of wall portions that define a stringer interior volume, the magnetic handling system comprising:
   a bladder configured to be received within the stringer interior volume of the hat stringer and comprising a magnetic insert, wherein the magnetic insert comprises a plurality of magnetic walls each being positioned and oriented to extend at least substantially aligned with a respective wall portion of the plurality of wall portions of the hat stringer,
   a magnetic carriage system comprising a carriage configured to be coupled to a support structure and comprising a magnetic head, wherein the magnetic head comprises a bracket and a plurality of magnetic sources supported by the bracket, wherein each magnetic source is configured to magnetically couple with a respective magnetic wall of the magnetic insert to produce an attractive magnetic force therebetween; and
   wherein the plurality of magnetic sources and the plurality of magnetic walls are configured to magnetically couple with one another to produce a plurality of attractive magnetic forces therebetween that are oriented along a plurality of different directions.

2. The magnetic handling system of claim 1, wherein the plurality of magnetic walls of the magnetic insert includes a pair of lateral magnetic walls that are respectively positioned and oriented to extend at least substantially aligned with a pair of sidewall portions of the hat stringer, and wherein the plurality of magnetic sources of the magnetic head include a pair of lateral magnetic sources that are respectively configured to magnetically couple with the pair of lateral magnetic walls of the magnetic insert.

3. The magnetic handling system of claim 2, wherein the attractive magnetic force produced between each lateral magnetic wall of the pair of lateral magnetic walls and a respective lateral magnetic source of the pair of lateral magnetic sources is directed through, and at least substantially normal to, a respective sidewall portion of the pair of sidewall portions of the hat stringer when the hat stringer is operably received between the bladder and the magnetic head.

4. The magnetic handling system of claim 2, wherein a first lateral magnetic source of the pair of lateral magnetic sources is configured to magnetically couple with a first lateral magnetic wall of the pair of lateral magnetic walls to produce therebetween a first attractive magnetic force of the plurality of attractive magnetic forces, wherein the first attractive magnetic force is oriented along a first direction, wherein a second lateral magnetic source of the pair of lateral magnetic sources is configured to magnetically couple with a second lateral magnetic wall of the pair of lateral magnetic walls to produce therebetween a second attractive magnetic force of the plurality of attractive magnetic forces, wherein the second attractive magnetic force is oriented along a second direction, and wherein the first direction is at least partially opposed to, and optionally at least substantially opposed to, the second direction.

5. The magnetic handling system of claim 4, wherein the plurality of magnetic walls of the magnetic insert further include a cap magnetic wall that is positioned and oriented to extend at least substantially aligned with a cap wall portion of the hat stringer that extends between and interconnects the pair of sidewall portions of the hat stringer, wherein the plurality of magnetic sources of the magnetic head further includes a cap magnetic source that is configured to magnetically couple with the cap magnetic wall of the magnetic insert to produce therebetween a third attractive magnetic force of the plurality of attractive magnetic forces, and wherein the third attractive magnetic force is oriented along a third direction that is at least partially normal to each of the first direction and the second direction.

6. The magnetic handling system of claim 1, wherein the bladder comprises a plurality of magnetic inserts that are spaced apart from one another along a bladder length of the bladder, and wherein the plurality of magnetic inserts are configured to magnetically engage with a respective plurality of magnetic heads to conform the hat stringer in a desired stringer longitudinal conformation, and wherein the magnetic carriage system includes a plurality of carriages that collectively include the plurality of magnetic heads (204), wherein each magnetic head of the plurality of magnetic heads is configured to magnetically engage a respective magnetic insert of the plurality of magnetic inserts.

7. The magnetic handling system of claim 6, wherein the magnetic handling system further includes a plurality of robotic arms that operatively connect the plurality of carriages to the support structure, and wherein each robotic arm is configured to control a position and an orientation of a respective carriage of the plurality of carriages.

8. The magnetic handling system of claim 7, wherein at least one robotic arm of the plurality of robotic arms is configured to at least one of:
 (i) rotate the magnetic head of the respective carriage about its longitudinal axis to apply twist to the hat stringer;
 (ii) laterally translate the respective carriage relative to at least one other carriage of the plurality of carriages to apply skew to the hat stringer; and
 (iii) translate the respective carriage along an azimuthal axis relative to at least one other carriage of the plurality of carriages to apply loft to the hat stringer.

9. A method of utilizing the magnetic handling system of claim 6 to handle the hat stringer, the method comprising:
 disposing the bladder within the stringer interior volume of the hat stringer;
 operably positioning the plurality of magnetic heads relative to the hat stringer such that each magnetic head is aligned with a corresponding magnetic insert of the plurality of magnetic inserts;
 magnetically engaging each magnetic head with the corresponding magnetic insert while the bladder is received within the stringer interior volume; and
 conforming the hat stringer into the desired stringer longitudinal conformation, wherein the conforming is performed subsequent to the magnetically engaging and while each magnetic head is magnetically engaged with the corresponding magnetic insert.

10. The method of claim 9, wherein the hat stringer is operatively retained between the plurality of magnetic heads and the bladder during the conforming, and wherein the conforming comprises moving at least one magnetic head relative to at least one other magnetic head.

11. The method of claim 9, wherein the conforming comprises applying twist to the hat stringer, wherein the applying twist comprises rotating a respective magnetic head of the plurality of magnetic heads about its longitudinal axis relative to at least one other magnetic head of the plurality of magnetic heads.

12. The method of claim 11, wherein the applying twist further comprises balancing an opposing twist torque from the hat stringer with the plurality of attractive magnetic forces between the magnetic head and the corresponding magnetic insert.

13. The method of claim 9, wherein the conforming comprises applying skew to the hat stringer, wherein the applying skew comprises laterally translating at least one magnetic head relative to at least one other magnetic head.

14. The method of claim 9, wherein the conforming further comprises applying loft to the hat stringer, wherein the applying loft comprises vertically translating one or more magnetic heads relative to one or more other magnetic heads.

15. The method of claim 9, further comprising:
 maintaining the hat stringer in the desired stringer longitudinal conformation and applying the hat stringer to an aircraft skin in the desired stringer longitudinal conformation.

16. The method of claim 9, wherein the magnetically engaging comprises, respective to each magnetic head and the corresponding magnetic insert, magnetically coupling a pair of lateral magnetic walls of the magnetic insert with a pair of lateral magnetic sources of the magnetic head and magnetically coupling a cap magnetic wall of the magnetic insert with a cap magnetic source of the magnetic head, wherein the pair of lateral magnetic walls of the magnetic insert are at least substantially aligned with a pair of sidewall portions of the hat stringer, and wherein the cap magnetic wall of the magnetic insert is at least substantially aligned with a cap wall portion of the hat stringer .

17. A method of utilizing the magnetic handling system of claim 6 to handle the hat stringer, the method comprising:
 disposing the bladder within the stringer interior volume of the hat stringer;
 operably positioning the plurality of magnetic heads relative to the hat stringer such that each magnetic head is aligned with a corresponding magnetic insert of the plurality of magnetic inserts; and
 magnetically engaging each magnetic head with the corresponding magnetic insert while the bladder is received within the stringer interior volume, wherein the magnetically engaging includes, respective to each magnetic head and the corresponding magnetic insert:
  magnetically coupling the plurality of magnetic sources comprised in each magnetic head with a corresponding plurality of magnetic walls comprised in the corresponding magnetic insert, wherein the magnetically coupling comprises producing the plurality of attractive magnetic forces between each magnetic head and the plurality of magnetic walls, wherein the plurality of attractive magnetic forces are respectively oriented along the plurality of different directions; and
  retaining the hat stringer within the bracket of the magnetic head utilizing the plurality of attractive magnetic forces.

18. The method claim 17, wherein the disposing comprises supporting a stringer wall interior surface of the hat stringer that defines the stringer interior volume against a bladder exterior surface of the bladder, wherein the plurality of magnetic inserts are positioned within the bladder interior of the bladder exterior surface, and wherein the retaining comprises urging the bladder exterior surface against the stringer wall interior surface.

19. The method of claim 17, wherein the magnetically coupling comprises producing a first attractive magnetic force along a first direction between a first lateral magnetic source of the plurality of magnetic sources and a first lateral magnetic wall of the plurality of magnetic walls and producing a second attractive magnetic force along a second direction between a second lateral magnetic source of the plurality of magnetic sources and a second lateral magnetic wall of the plurality of magnetic walls, and wherein the first direction is at least partially opposed to the second direction.

20. The method of claim 17, further comprising conforming the hat stringer into the desired stringer longitudinal conformation, wherein the conforming is performed subsequent to the magnetically engaging and while each magnetic head is magnetically engaged with the corresponding magnetic insert.

21. The method of claim 20, wherein the hat stringer is operatively retained between the plurality of magnetic heads and the bladder during the conforming , and wherein the conforming comprises moving at least one magnetic head relative to at least one other magnetic head.

\* \* \* \* \*